US011132371B2

(12) United States Patent
Power et al.

(10) Patent No.: US 11,132,371 B2
(45) Date of Patent: Sep. 28, 2021

(54) USER CUSTOMISED SEARCH ENGINE USING MACHINE LEARNING, NATURAL LANGUAGE PROCESSING AND READABILITY ANALYSIS

(71) Applicant: INQUISITIVE PTY LIMITED, New South Wales (AU)

(72) Inventors: Timothy Power, New South Wales (AU); Luke Tomes, Auckland (NZ); Mitchell Lane, Wellington (NZ)

(73) Assignee: INQUISITIVE PTY LIMITED, New South Wales (AU)

( * ) Notice: Subject to any disclaimer, the term of this patent is extended or adjusted under 35 U.S.C. 154(b) by 0 days.

(21) Appl. No.: 16/772,664

(22) PCT Filed: Dec. 14, 2018

(86) PCT No.: PCT/AU2018/051340
§ 371 (c)(1),
(2) Date: Jun. 12, 2020

(87) PCT Pub. No.: WO2019/113648
PCT Pub. Date: Jun. 20, 2019

(65) Prior Publication Data
US 2021/0216560 A1 Jul. 15, 2021

(30) Foreign Application Priority Data
Dec. 14, 2017 (AU) .............................. 2017905009

(51) Int. Cl.
*G06F 16/2457* (2019.01)
*G06F 40/30* (2020.01)
(Continued)

(52) U.S. Cl.
CPC .... *G06F 16/24578* (2019.01); *G06F 16/2272* (2019.01); *G06F 16/248* (2019.01); *G06F 40/30* (2020.01); *G06N 20/00* (2019.01)

(58) Field of Classification Search
CPC ........... G06F 16/24578; G06F 16/2272; G06F 16/248; G06F 40/30; G06N 20/00
See application file for complete search history.

(56) References Cited

U.S. PATENT DOCUMENTS

2006/0161543 A1 7/2006 Kang et al.
2008/0154848 A1 6/2008 Dean et al.
(Continued)

FOREIGN PATENT DOCUMENTS

KR  10-2008-0058569 A  6/2008
KR  10-2010-0049271 A  5/2020
WO  2014127183 A2  8/2014

OTHER PUBLICATIONS

2018382226, Australian Examination Report, dated Jun. 30, 2020, 7 pages.
(Continued)

*Primary Examiner* — Truong V Vo
(74) *Attorney, Agent, or Firm* — Stoel Rives LLP

(57) ABSTRACT

A computer implemented method, computerised system and computer readable recording medium are disclosed. In one aspect, the computer implemented method comprises steps of: generating an index of electronic objects, comprising steps of: performing, upon each electronic object, natural language processing, using a natural language processor, and readability analysis, using a readability analyser, to generate natural language processing data and a readability score for the respective object; and storing in the index, for each electronic object, electronic object data indicative of the electronic object and associated meta-data indicative of the natural language processing data and the readability score; receiving, from a user operating a user processing system, a request to perform a search of the index, wherein the request has associated therewith input data; performing, upon the input data, natural language processing, using the natural language processor to generate natural language processing data and a readability range for the input data; searching, using a search engine, the index based upon the readability range and the natural language processing data for the input data, to determine a plurality of correlated electronic objects; generating, using a ranking engine, a
(Continued)

ranked list of the plurality of correlated electronic objects based on a correlation level for each of the plurality of electronic objects and a machine learned rating generated by a machine learned rating prediction system trained according to a profile associated with the user, the profile being indicative of natural language processing data generated, by the natural language processor, based on previous search requests received from the user and performed by the search engine; and transferring, to the user processing system, search results indicative of at least a portion of the ranked list of the plurality of correlated electronic objects.

21 Claims, 11 Drawing Sheets

(51) Int. Cl.
*G06F 16/22* (2019.01)
*G06F 16/248* (2019.01)
*G06N 20/00* (2019.01)

(56) References Cited

U.S. PATENT DOCUMENTS

| 2013/0218898 | A1 | 8/2013 | Raghavan et al. |
| 2017/0193092 | A1 | 7/2017 | Byron et al. |
| 2017/0199878 | A1 | 7/2017 | Ramasamy et al. |
| 2019/0146976 | A1* | 5/2019 | Lachmi .................. G06F 40/30 707/730 |

OTHER PUBLICATIONS

Collins-Thompson, Kevyn, et al., "Personalizing Web Search Results by Reading Level", CKIM'11, Glasgow, Scotland, Oct. 24-28, 2011, pp. 403-412.

PCT/AU2018/051340, International Preliminary Report on Patentability, dated Jun. 16, 2020, 7 pages.

PCT/AU2018/051340, International Search Report and Written Opinion, dated Apr. 1, 2019, 9 pages.

* cited by examiner

USER CUSTOMISED SEARCH ENGINE USING MACHINE LEARNING, NATURAL LANGUAGE PROCESSING AND READABILITY ANALYSIS

RELATED APPLICATIONS

This application is a national phase application of International Patent Application No. PCT/USAU2018/051340, filed 14 Dec. 2018, which claims priority from Australian Provisional Patent Application No. 2017905009, filed 14 Dec. 2017, each of which is hereby incorporated by reference herein in its entirety.

TECHNICAL FIELD

The present invention relates to a computerised method, computerised system, and computer readable recording medium for operating a user customised search engine using machine learning, natural language processing and readability analysis.

BACKGROUND

Current search engines attempt to determine the relevance of an indexed object based on keywords. For some search engines, previous searches performed can be taken into account when generating the search results. However, the search results that may be returned do not taken into account the sophistication of the searcher. Thus, for a primary school student and a university student may receive very similar search results based on the same search criteria provided to the search engine. In one instance, the search results may be too sophisticated for the primary school student, and in another instance the search results may be lack sophistication for the university student. Whilst additional search terms can be provided by the searcher to indicate the level of sophistication required in relation to the search results, generally this will result in a much narrower set of search results than required or it may simply not be possible to achieve the desired outcome. Furthermore, due to this problem of users attempting to revise search terms and submitting additional search requests, the load on the server processing system operably as well as the associated network can increase, resulting in undesirable delivery of accurate search results for the level of sophistication of the user.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

It is an object of the present invention to substantially overcome or at least ameliorate one or more disadvantages of existing arrangements.

In one aspect there is provided a computer implemented method performed by a computerised system, wherein the computer implemented method comprises steps of:

generating an index of electronic objects, comprising steps of:

performing, upon each electronic object, natural language processing, using a natural language processor, and readability analysis, using a readability analyser, to generate natural language processing data and a readability score for the respective object; and storing in the index, for each electronic object, electronic object data indicative of the electronic object and associated meta-data indicative of the natural language processing data and the readability score;

receiving, from a user operating a user processing system, a request to perform a search of the index, wherein the request has associated therewith input data;

performing, upon the input data, natural language processing, using the natural language processor to generate natural language processing data and a readability range for the input data;

searching, using a search engine, the index based upon the readability range and the natural language processing data for the input data, to determine a plurality of correlated electronic objects;

generating, using a ranking engine, a ranked list of the plurality of correlated electronic objects based on a correlation level for each of the plurality of electronic objects and a machine learned rating generated by a machine learned rating prediction system trained according to a profile associated with the user, the profile being indicative of natural language processing data generated, by the natural language processor, based on previous search requests received from the user and performed by the search engine; and transferring, to the user processing system, search results indicative of at least a portion of the ranked list of the plurality of correlated electronic objects.

In certain embodiments, the plurality of electronic objects are electronic lesson objects stored in a data store accessible by the computerised system, wherein each electronic lesson object is indicative of lesson content for a lesson, wherein the input data is outcome data determined by the natural language processor in respect of processing curriculum text, wherein the searching performed by the search engine is to determine one or more correlated electronic lesson objects to assign to a time slot of a lesson plan.

In certain embodiments, the method includes:

transferring, to the user processing system, the search results indicative of only a top ranked lesson determined by the ranking engine for the time slot; and receiving, from the user processing system, a selection of the top ranked lesson for teaching, wherein the electronic lesson object retrieved from data store relates to the top ranked lesson.

In certain embodiments, the method includes:

storing, in the data store, data indicative of non-top ranked relevant lessons for the time slot;

transferring, to the user processing system, only a top ranked lesson determined by the ranking engine for the time slot;

receiving, from the user processing system, a request from the user to be presented with one or more alternate lessons for the time slot;

retrieving, from the data store, at least some of the non-top ranked relevant lessons for the time slot;

transferring, to the user processing system, one or more alternate lessons for the time slot indicative of at least some of the non-top ranked relevant lessons for the time slot;

receiving, from the user processing system, a selection of one of the one or more alternate lessons for the time slot;

retrieving, from the data store, lesson content for the selected alternate lesson for the time slot;

transferring, to the user processing system, the lesson content for the alternate lesson for the time slot; and adjusting, by a machine learned content prediction system, the profile associated with the user based on the user dismissing the top ranked lesson and selecting the alternate lesson.

In certain embodiments, the method includes populating the data store with curriculum data, wherein the method includes:

obtaining new curriculum text data indicative of a new curriculum;

performing natural language processing on the new curriculum text data to generate natural language processing data for each outcome of the new curriculum;

performing readability analysis on the new curriculum text data to generate a readability range for each outcome of the new curriculum;

storing, in the data store, curriculum data indicative of the new curriculum including readability score data indicative of the readability range for each outcome and the natural language processing data for each outcome of the curriculum; and modifying the index according to the curriculum data.

In certain embodiments, the method includes populating the data store with a new electronic lesson object, wherein the method includes:

obtaining new lesson content text data indicative of lesson content for a new lesson;

performing readability analysis upon the new lesson content text data to generate a readability score for the new lesson;

performing natural language processing on the new lesson content text data to generate the natural language processing data for the new lesson;

storing, in the data store, the new electronic lesson object indicative of the lesson content for the new lesson, readability score data indicative of the readability score for the new lesson and the natural language processing data for the new lesson; and modifying the index according to the new lesson stored in the data store.

In certain embodiments, the readability score indexed within the index for each electronic object is based upon a word count, a mean sentence length and a mean log word frequency of the respective electronic object.

In a further aspect there is provided a computerised system configured to perform steps of:

generating an index of electronic objects, comprising steps of:

performing, upon each electronic object, natural language processing, using a natural language processor, and readability analysis, using a readability analyser, to generate natural language processing data and a readability score for the respective object; and storing in the index, for each electronic object, electronic object data indicative of the electronic object and associated meta-data indicative of the natural language processing data and the readability score;

receiving, from a user operating a user processing system, a request to perform a search of the index, wherein the request has associated therewith input data;

performing, upon the input data, natural language processing, using the natural language processor to generate natural language processing data and a readability range for the input data;

searching, using a search engine, the index based upon the readability range and the natural language processing data for the input data, to determine a plurality of correlated electronic objects;

generating, using a ranking engine, a ranked list of the plurality of correlated electronic objects based on a correlation level for each of the plurality of electronic objects and a machine learned rating generated by a machine learned rating prediction system trained according to a profile associated with the user, the profile being indicative of natural language processing data generated, by the natural language processor, based on previous search requests received from the user and performed by the search engine; and transferring, to the user processing system, search results indicative of at least a portion of the ranked list of the plurality of correlated electronic objects.

In certain embodiments, the plurality of electronic objects are electronic lesson objects stored in a data store accessible by the computerised system, wherein each electronic lesson object is indicative of lesson content for a lesson, wherein the input data is outcome data determined by the natural language processor in respect of processing curriculum text, wherein the searching performed by the search engine is to determine one or more correlated electronic lesson objects to assign to a time slot of a lesson plan.

In certain embodiments, the computerised system is configured to perform steps comprising:

transferring, to the user processing system, the search results indicative of only a top ranked lesson determined by the ranking engine for the time slot; and receiving, from the user processing system, a selection of the top ranked lesson for teaching, wherein the electronic lesson object retrieved from data store relates to the top ranked lesson.

In certain embodiments, the computerised system is configured to perform steps comprising:

storing, in the data store, data indicative of non-top ranked relevant lessons for the time slot;

transferring, to the user processing system, only a top ranked lesson determined by the ranking engine for the time slot;

receiving, from the user processing system, a request from the user to be presented with one or more alternate lessons for the time slot;

retrieving, from the data store, at least some of the non-top ranked relevant lessons for the time slot;

transferring, to the user processing system, one or more alternate lessons for the time slot indicative of at least some of the non-top ranked relevant lessons for the time slot;

receiving, from the user processing system, a selection of one of the one or more alternate lessons for the time slot;

retrieving, from the data store, lesson content for the selected alternate lesson for the time slot;

transferring, to the user processing system, the lesson content for the alternate lesson for the time slot; and adjusting, by a machine learned content prediction system, the profile associated with the user based on the user dismissing the top ranked lesson and selecting the alternate lesson.

In certain embodiments, the computerised system is configured to populate the data store with curriculum data comprising steps of:

obtaining new curriculum text data indicative of a new curriculum;

performing natural language processing on the new curriculum text data to generate natural language processing data for each outcome of the new curriculum;

performing readability analysis on the new curriculum text data to generate a readability range for each outcome of the new curriculum;

storing, in the data store, curriculum data indicative of the new curriculum including readability score data indicative of the readability range for each outcome and the natural language processing data for each outcome of the curriculum; and modifying the index according to the curriculum data.

In certain embodiments, the computerised system is configured to populate the data store with a new electronic lesson object comprising steps of:

obtaining new curriculum text data indicative of a new curriculum;

performing natural language processing on the new curriculum text data to generate natural language processing data for each outcome of the new curriculum;

performing readability analysis on the new curriculum text data to generate a readability range for each outcome of the new curriculum;

storing, in the data store, curriculum data indicative of the new curriculum including readability score data indicative of the readability range for each outcome and the natural language processing data for each outcome of the curriculum; and modifying the index according to the curriculum data.

In certain embodiments, the computerised system is configured to determine the readability score for each electronic object based upon a word count, a mean sentence length and a mean log word frequency of the respective electronic object.

In a further aspect there is provided a computer readable recording medium having recorded one or more programs that cause a computerised system to execute steps of:

generating an index of electronic objects, comprising steps of:

performing, upon each electronic object, natural language processing, using a natural language processor, and readability analysis, using a readability analyser, to generate natural language processing data and a readability score for the respective object; and storing in the index, for each electronic object, electronic object data indicative of the electronic object and associated meta-data indicative of the natural language processing data and the readability score;

receiving, from a user operating a user processing system, a request to perform a search of the index, wherein the request has associated therewith input data;

performing, upon the input data, natural language processing, using the natural language processor to generate natural language processing data and a readability range for the input data;

searching, using a search engine, the index based upon the readability range and the natural language processing data for the input data, to determine a plurality of correlated electronic objects;

generating, using a ranking engine, a ranked list of the plurality of correlated electronic objects based on a correlation level for each of the plurality of electronic objects and a machine learned rating generated by a machine learned rating prediction system trained according to a profile associated with the user, the profile being indicative of natural language processing data generated, by the natural language processor, based on previous search requests received from the user and performed by the search engine; and transferring, to the user processing system, search results indicative of at least a portion of the ranked list of the plurality of correlated electronic objects.

In certain embodiments, the plurality of electronic objects are electronic lesson objects stored in a data store accessible by the computerised system, wherein each electronic lesson object is indicative of lesson content for a lesson, wherein the input data is outcome data determined by the natural language processor in respect of processing curriculum text, wherein the searching performed by the search engine is to determine one or more correlated electronic lesson objects to assign to a time slot of a lesson plan.

In certain embodiments, the one or more programs cause the computerised system to execute steps of:

transferring, to the user processing system, the search results indicative of only a top ranked lesson determined by the ranking engine for the time slot; and receiving, from the user processing system, a selection of the top ranked lesson for teaching, wherein the electronic lesson object retrieved from data store relates to the top ranked lesson.

In certain embodiments, the one or more programs cause the computerised system to execute steps of:

storing, in the data store, data indicative of non-top ranked relevant lessons for the time slot;

transferring, to the user processing system, only a top ranked lesson determined by the ranking engine for the time slot;

receiving, from the user processing system, a request from the user to be presented with one or more alternate lessons for the time slot;

retrieving, from the data store, at least some of the non-top ranked relevant lessons for the time slot;

transferring, to the user processing system, one or more alternate lessons for the time slot indicative of at least some of the non-top ranked relevant lessons for the time slot;

receiving, from the user processing system, a selection of one of the one or more alternate lessons for the time slot;

retrieving, from the data store, lesson content for the selected alternate lesson for the time slot;

transferring, to the user processing system, the lesson content for the alternate lesson for the time slot; and adjusting, by a machine learned content prediction system, the profile associated with the user based on the user dismissing the top ranked lesson and selecting the alternate lesson.

In certain embodiments, the one or more programs cause the computerised system to populate the data store with curriculum data including steps of:

obtaining new curriculum text data indicative of a new curriculum;

performing natural language processing on the new curriculum text data to generate natural language processing data for each outcome of the new curriculum;

performing readability analysis on the new curriculum text data to generate a readability range for each outcome of the new curriculum;

storing, in the data store, curriculum data indicative of the new curriculum including readability score data indicative of the readability range for each outcome and the natural language processing data for each outcome of the curriculum; and modifying the index according to the curriculum data.

In certain embodiments, the one or more programs cause the computerised system to execute steps of populating the data store with a new electronic lesson object comprising steps of:

obtaining new curriculum text data indicative of a new curriculum;

performing natural language processing on the new curriculum text data to generate natural language processing data for each outcome of the new curriculum;

performing readability analysis on the new curriculum text data to generate a readability range for each outcome of the new curriculum;

storing, in the data store, curriculum data indicative of the new curriculum including readability score data indicative of the readability range for each outcome and the natural language processing data for each outcome of the curriculum; and modifying the index according to the curriculum data.

In certain embodiments, the one or more programs cause the computerised system to determine the readability score for each electronic object based upon a word count, a mean sentence length and a mean log word frequency of the respective electronic object.

In another aspect there is provided a computer implemented method performed by a computerised system for determining lesson content for a teaching and learning plan, wherein the method includes:

receiving, from a user processing system operated by a user, a request to determine a lesson for a time slot of a teaching and learning plan stored in a data store accessible by the computerised system, wherein the time slot has associated therewith outcome data from a curriculum;

searching, using a search engine, an index of a plurality of lessons using the outcome data for the time slot to determine a plurality of highly correlated lessons;

ranking, by a ranking engine and based on a user profile of the user, the plurality of ranked lessons for the time slot; and transferring, to the user processing system, lesson content, retrieved from the data store, based on one of the ranked lessons for the time slot.

In certain embodiments, the searching includes determining a level of correlation between readability score data and natural language processing data of lesson content for each lesson stored in the data store and readability score range data and natural language processing data for the outcome data of the time slot.

In certain embodiments, the method includes:

transferring, to the user processing system, a top ranked lesson determined by the ranking engine for the time slot; and receiving, from the user processing system, a selection of the top ranked lesson for teaching, wherein the lesson content retrieved from data store relates to the top ranked lesson.

In certain embodiments, the method includes:

storing, in the data store, data indicative of non-top ranked relevant lessons for the time slot;

transferring, to the user processing system, a top ranked lesson determined by the ranking engine for the time slot;

receiving, from the user processing system, a request from the user to be presented with one or more alternate lessons for the time slot;

retrieving, from the data store, at least some of the non-top ranked relevant lessons for the time slot;

transferring, to the user processing system, one or more alternate lessons for the time slot indicative of at least some of the non-top ranked relevant lessons for the time slot;

receiving, from the user processing system, a selection of one of the one or more alternate lessons for the time slot;

retrieving, from the data store, lesson content for the selected alternate lesson for the time slot;

transferring, to the user processing system, the lesson content for the alternate lesson for the time slot; and adjusting, by a machine learning engine, the user content profile based on the user dismissing the top ranked relevant lesson and selecting the alternate lesson.

In certain embodiments, the method includes:

receiving, from the user processing system via a user interface, one or more search terms for determining the lesson for the time slot;

performing, using a text analysis system, natural language processing upon the one or more search terms to determine one or more concepts associated with the one or more search terms; and searching, by the search engine, the index using the one or more concepts associated with the one or more search terms in order to determine the plurality of highly correlated lessons for the time slot.

In certain embodiments, the method includes populating the data store with curriculum data, wherein the method includes:

obtaining new curriculum text data indicative of a new curriculum;

performing natural language processing on the new curriculum text data to generate natural language processing data for each outcome of the new curriculum;

storing, in the data store, curriculum data indicative of the new curriculum including readability score range data indicative of a readability score range for each outcome and the natural language processing data for each outcome of the curriculum; and modifying the index according to the curriculum data.

In certain embodiments, the method includes populating the data store with lesson content data, wherein the method includes:

obtaining new lesson content text data indicative of lesson content for a new lesson;

performing readability analysis upon the new lesson content text data to generate a readability score for the new lesson;

performing natural language processing on the new lesson content text data to generate the natural language processing data for the new lesson;

storing, in the data store, lesson content data indicative of the lesson content for the new lesson, readability score data indicative of the readability score for the new lesson and the natural language processing data for the new lesson; and modifying the index according to the curriculum data.

In another aspect there is provided a computerised system for determining lesson content for a teaching and learning plan, wherein the computerised system is configured to:

receive, from a user processing system operated by a user, a request to determine a lesson for a time slot of a teaching and learning plan stored in a data store accessible by the computerised system, wherein the time slot has associated therewith outcome data from a curriculum;

search, using a search engine, an index of a plurality of lessons using the outcome data for the time slot to determine a plurality of highly correlated lessons;

rank, using a ranking engine and based a user profile of the user, the plurality of ranked lessons for the time slot; and transfer, to the user processing system, lesson content, retrieved from the data store, based on one of the ranked lessons for the time slot.

In certain embodiments, the search engine is configured to determine a level of correlation between readability score data and natural language processing data of lesson content for each lesson stored in the data store and readability score range data and natural language processing data for the outcome data of the time slot.

In certain embodiments, the computerised system is configured to:

transfer, to the user processing system, a top ranked lesson determined by the ranking engine for the time slot; and receive, from the user processing system, a selection of the top ranked lesson for teaching, wherein the lesson content retrieved from data store relates to the top ranked lesson.

In certain embodiments, the computerised system is configured to:

store, in the data store, data indicative of non-top ranked relevant lessons for the time slot;

transfer, to the user processing system, a top ranked lesson determined by the ranking engine for the time slot;

receive, from the user processing system, a request from the user to be presented with one or more alternate lessons for the time slot;

retrieve, from the data store, at least some of the non-top ranked relevant lessons for the time slot;

transfer, to the user processing system, one or more alternate lessons for the time slot indicative of at least some of the non-top ranked relevant lessons for the time slot;

receive, from the user processing system, a selection of one of the one or more alternate lessons for the time slot;

retrieve, from the data store, lesson content for the selected alternate lesson for the time slot;

transfer, to the user processing system, the lesson content for the alternate lesson for the time slot; and adjust, by a machine learning engine, the user content profile based on the user dismissing the top ranked relevant lesson and selecting the alternate lesson.

In certain embodiments, the computerised system is configured to:

receive, from the user processing system via a user interface, one or more search terms for determining the lesson for the time slot;

perform, using a text analysis system, natural language processing upon the one or more search terms to determine one or more concepts associated with the one or more search terms; and search, by the search engine, the index using the one or more concepts associated with the one or more search terms in order to determine the plurality of highly correlated lessons for the time slot.

In certain embodiments, the computerised system is configured to populate the data store with curriculum data, wherein the computerised system is configured to:

obtain new curriculum text data indicative of a new curriculum;

perform natural language processing on the new curriculum text data to generate natural language processing data for each outcome of the new curriculum;

store, in the data store, curriculum data indicative of the new curriculum including readability score range data indicative of a readability score range for each outcome and the natural language processing data for each outcome of the curriculum; and modify the index according to the curriculum data.

In certain embodiments, the computerised system is configured to populate the data store with lesson content data, wherein computerised system is configured to:

obtain new lesson content text data indicative of lesson content for a new lesson;

perform readability analysis upon the new lesson content text data to generate a readability score for the new lesson;

perform natural language processing on the new lesson content text data to generate the natural language processing data for the new lesson;

store, in the data store, lesson content data indicative of the lesson content for the new lesson, readability score data indicative of the readability score for the new lesson and the natural language processing data for the new lesson; and modify the index according to the curriculum data.

In another aspect there is provided one or more computer readable mediums including a plurality of executable instructions for configuring a computerised system to determine lesson content for a teaching and learning plan, wherein upon execution of the plurality of executable instructions, the computerised system is configured to:

receive, from a user processing system operated by a user, a request to determine a lesson for a time slot of a teaching and learning plan stored in a data store accessible by the computerised system, wherein the time slot has associated therewith outcome data from a curriculum;

search, using a search engine, an index of a plurality of lessons using the outcome data for the time slot to determine a plurality of highly correlated lessons;

rank, using a ranking engine and based a user profile of the user, the plurality of ranked lessons for the time slot; and transfer, to the user processing system, lesson content, retrieved from the data store, based on one of the ranked lessons for the time slot.

In certain embodiments, the search engine is configured by at some of the one or more computer readable mediums to determine a level of correlation between readability score data and natural language processing data of lesson content for each lesson stored in the data store and readability score range data and natural language processing data for the outcome data of the time slot.

In certain embodiments, the computerised system is configured by at least some of the one or more computer readable mediums to:

transfer, to the user processing system, a top ranked lesson determined by the ranking engine for the time slot; and receive, from the user processing system, a selection of the top ranked lesson for teaching, wherein the lesson content retrieved from data store relates to the top ranked lesson.

In certain embodiments, the computerised system is configured by at least some of the one or more computer readable mediums to:

store, in the data store, data indicative of non-top ranked relevant lessons for the time slot;

transfer, to the user processing system, a top ranked lesson determined by the ranking engine for the time slot;

receive, from the user processing system, a request from the user to be presented with one or more alternate lessons for the time slot;

retrieve, from the data store, at least some of the non-top ranked relevant lessons for the time slot;

transfer, to the user processing system, one or more alternate lessons for the time slot indicative of at least some of the non-top ranked relevant lessons for the time slot;

receive, from the user processing system, a selection of one of the one or more alternate lessons for the time slot;

retrieve, from the data store, lesson content for the selected alternate lesson for the time slot;

transfer, to the user processing system, the lesson content for the alternate lesson for the time slot; and adjust, by a machine learning engine, the user content profile based on the user dismissing the top ranked relevant lesson and selecting the alternate lesson.

In certain embodiments, the computerised system is configured by at least some of the one or more computer readable mediums to:

receive, from the user processing system via a user interface, one or more search terms for determining the lesson for the time slot;

perform, using a text analysis system, natural language processing upon the one or more search terms to determine one or more concepts associated with the one or more search terms; and search, by the search engine, the index using the one or more concepts associated with the one or more search terms in order to determine the plurality of highly correlated lessons for the time slot.

In certain embodiments, the computerised system is configured by at least some of the one or more computer readable mediums to populate the data store with curriculum data, wherein the computerised system is configured to:

obtain new curriculum text data indicative of a new curriculum;

perform natural language processing on the new curriculum text data to generate natural language processing data for each outcome of the new curriculum;

store, in the data store, curriculum data indicative of the new curriculum including readability score range data indicative of a readability score range for each outcome and the natural language processing data for each outcome of the curriculum; and modify the index according to the curriculum data.

In certain embodiments, the computerised system is configured by at least some of the one or more computer readable mediums to populate the data store with lesson content data, wherein computerised system is configured to:

obtain new lesson content text data indicative of lesson content for a new lesson;

perform readability analysis upon the new lesson content text data to generate a readability score for the new lesson;

perform natural language processing on the new lesson content text data to generate the natural language processing data for the new lesson;

store, in the data store, lesson content data indicative of the lesson content for the new lesson, readability score data indicative of the readability score for the new lesson and the natural language processing data for the new lesson; and modify the index according to the curriculum data.

Other aspects and embodiments will be appreciated throughout the detailed description of the one or more preferred embodiments.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION OF EXAMPLE EMBODIMENTS

The following modes, given by way of example only, are described in order to provide a more precise understanding of the subject matter of a preferred embodiment or embodiments.

Figure 1:
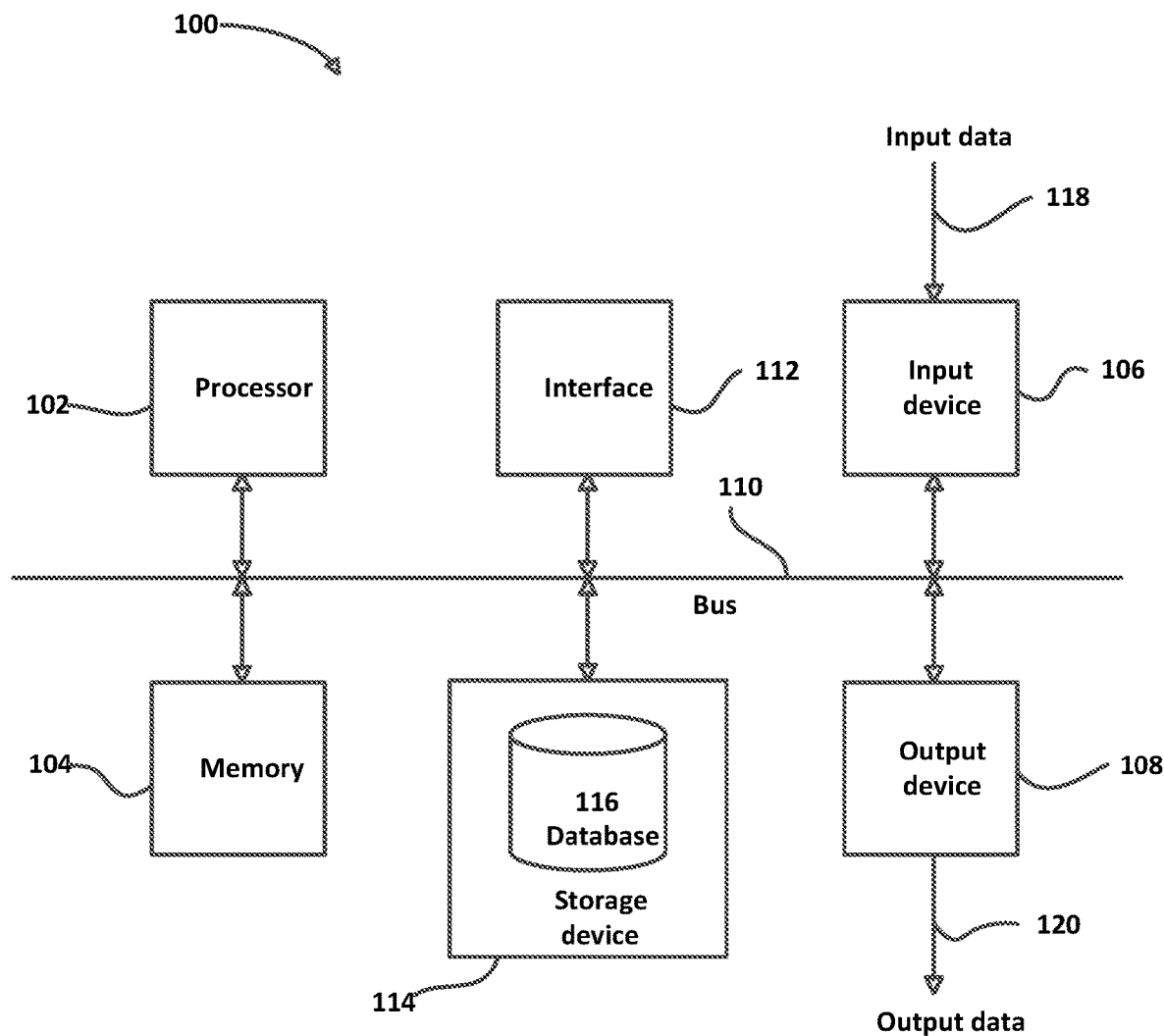
FIG. 1 illustrates a functional block diagram of an example processing device that can be utilised to embody or give effect to a particular embodiment.

A particular embodiment of the present invention can be realised using a processing device, an example of which is shown in FIG. 1. In particular, the processing device 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc.

The processor 102 could include more than one distinct processing device, for example to handle different functions within the processing device 100.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc . . . .

Examples of electronic data storage devices 114 can include disk storage, optical discs, such as CD, DVD, Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing device 100 may be any form of terminal, PC, laptop, notebook, tablet, smart phone, specialised hardware, or the like.

Figure 2:
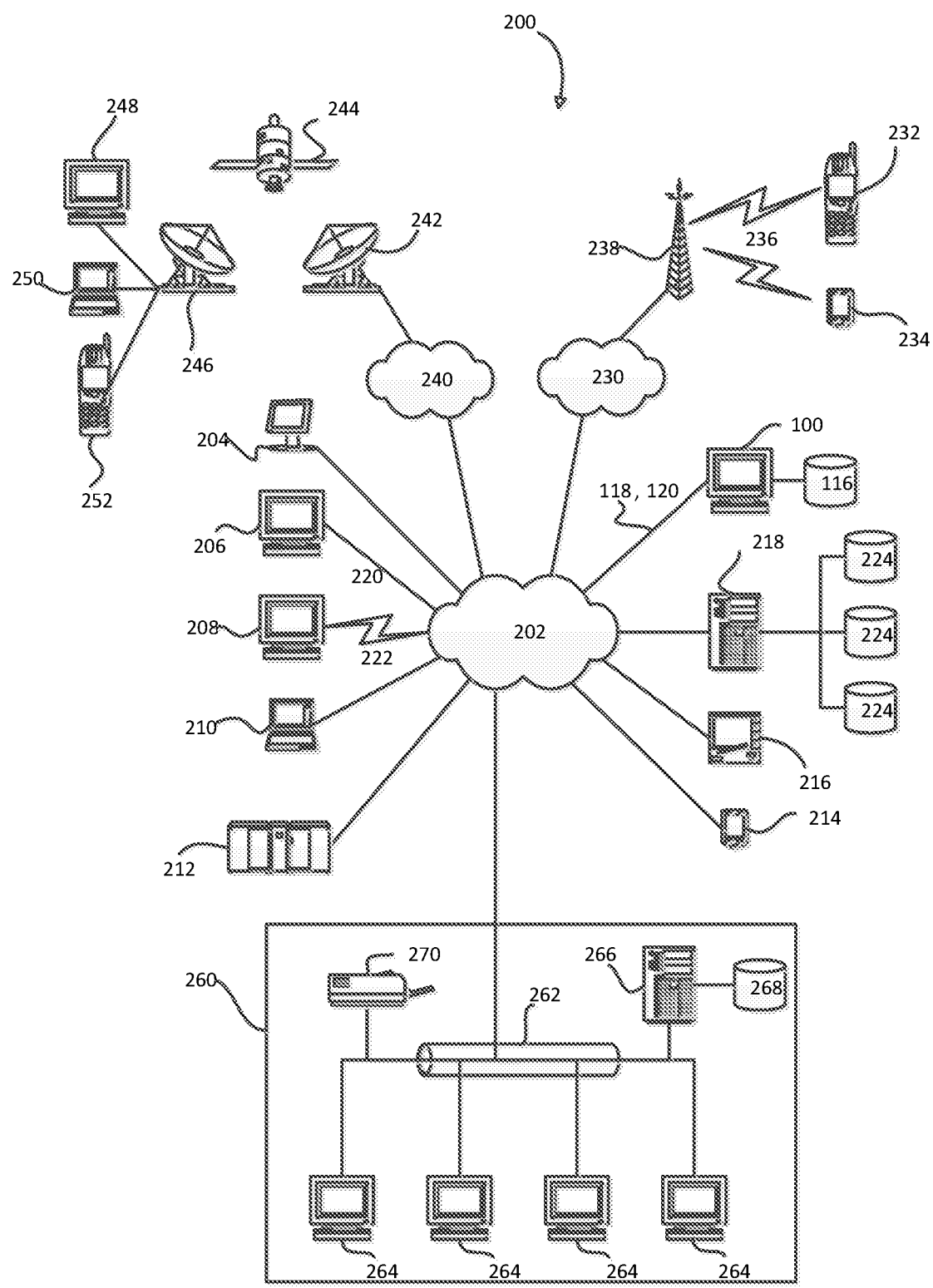
FIG. 2 illustrates an example network infrastructure that can be utilised to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with Ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, Ethernet, token ring, FDDI ring, star, etc., networks, or mobile telephone networks, such as GSM, CDMA or 3G, etc., networks, and may be wholly or partially wired, including for example optical fiber, or wireless networks, depending on a particular implementation.

Figure 10:
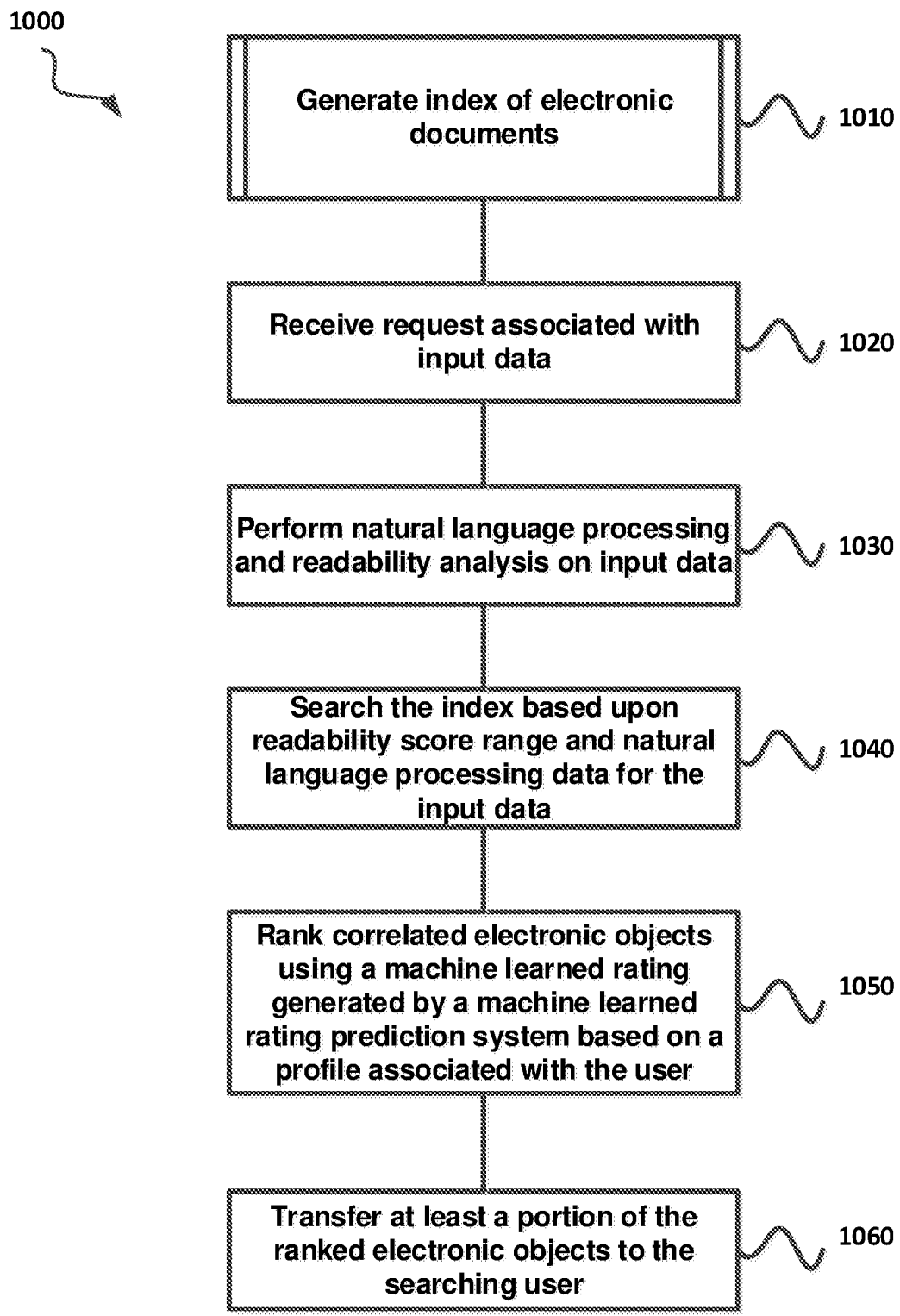
FIG. 10 is a flow diagram representing an example method performed by a computerised system.

Referring to FIG. 10 there is shown a flow diagram representing a method 1000 performed by a computerised system 300 to perform indexing and searching of indexed electronic objects.

At step 1010 the method includes the computerised system generating an index of electronic objects.

Figure 11:
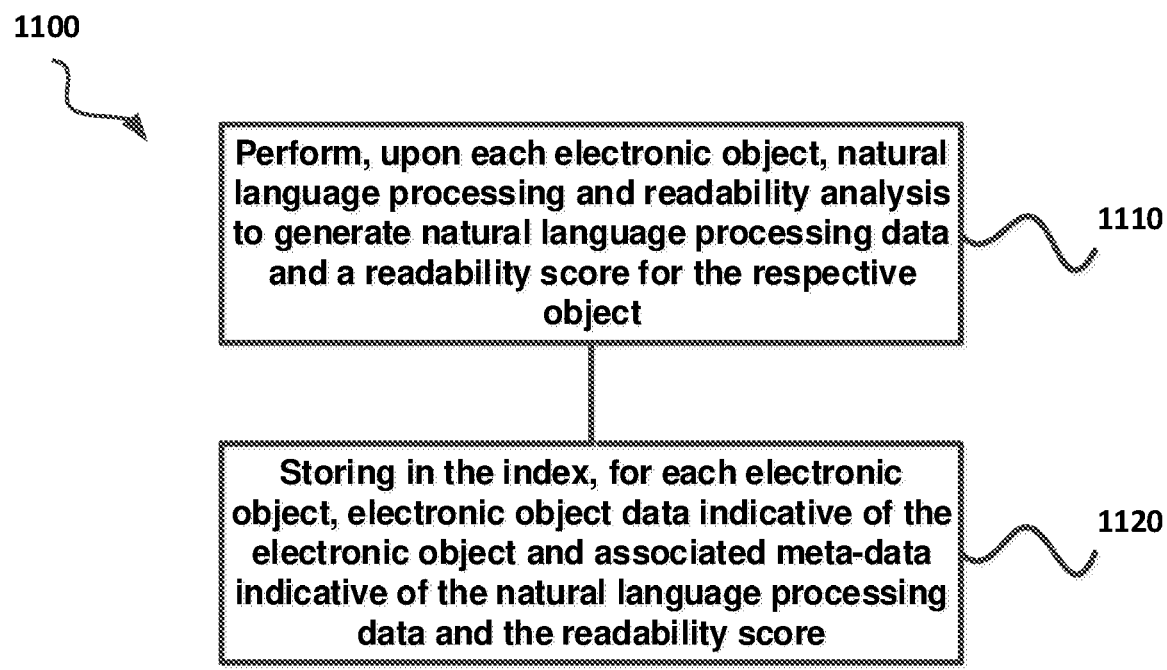
FIG. 11 is a flow diagram representing an example method for generating an index of the electronic objects.

A method for performing step 1010 in order to generate the index of the electronic objects comprises steps are shown in FIG. 11. In particular, at step 1110, the method includes performing, upon each electronic object, natural language processing, using a natural language processor, and readability analysis, using a readability analyser, to generate natural language processing data and a readability score for the respective object. At step 1120, the method includes storing in the index, for each electronic object, electronic object data indicative of the electronic object and associated meta-data indicative of the natural language processing data and the readability score. In one form, the readability score indexed within the index for each electronic object is based upon a word count, a mean sentence length and a mean log word frequency of the respective electronic object.

Returning to FIG. 10, the method 1000 then moves to step 1020 which includes the computerised system receiving, from a user operating a user processing system, a request to perform a search of the index, wherein the request has associated therewith input data.

The method 1000 then continues to step 1030 which includes the computerised system performing, upon the input data, natural language processing, using the natural language processor, and readability analysis using the readability analyser, to generate natural language processing data and a readability score range for the input data.

The method 1000 then continues to step 1040 which includes searching, using a search engine, the index based upon the readability score range and the natural language processing data for the input data, to determine a plurality of correlated electronic objects.

The method 1000 then continues to step 1050 which includes generating, using a ranking engine, a ranked list of the plurality of correlated electronic objects based on a correlation level for each of the plurality of correlated electronic objects and a machine learned rating generated by a machine learned rating prediction system trained according to a profile associated with the user, the profile being indicative of natural language processing data generated, by the natural language processor, based on previous search requests received from the user and performed by the search engine.

The method 1000 then continues to step 1060 which includes the computerised system transferring, to the user processing system, search results indicative of at least a portion of the ranked list of the plurality of correlated electronic objects.

As electronic objects are indexed according to the readability score and according to natural language processing data, more accurate searching can be performed by the search engine. Furthermore, readability analysis and natural language processing is performed upon the search text, the search engine can perform the search to generate accurate search results based on a level of correlation between the natural language processing data and the readability score. This in turn results in more accurate search results being returned to the searching user, thereby reducing processing load upon the computerised due to the reduction of additional searches needing to be performed in response to refined search criteria, which in turn reduces network load.

In one form, the readability analyser may score the electronic document using one of the following:
the Flesch Reading Ease (FRE) formula:

$$FRE = 206.835 - (1.015 \times ASL) - (84.6 \times ASPW)$$

where:
ASL is the average sentence length
ASPW is the Average Syllables Per Word
the Flesch-Kincaid grade level (FK):

$$FK = 0.39\left(\frac{\text{total words}}{\text{total sentences}}\right) + 11.8\left(\frac{\text{total syllables}}{\text{total words}}\right) - 15.59^l$$

the Coleman-Liau Index (CLI):

$$CLI = 0.0588L - 0.296S - 15.8$$

where:
L is the average number of letters per 100 words;
S is the average number of sentences per 100 words Each electronic object may be an electronic document. For example a Portable Document Format (PDF) document, a Word document, a webpage, or the like.

Figure 3:
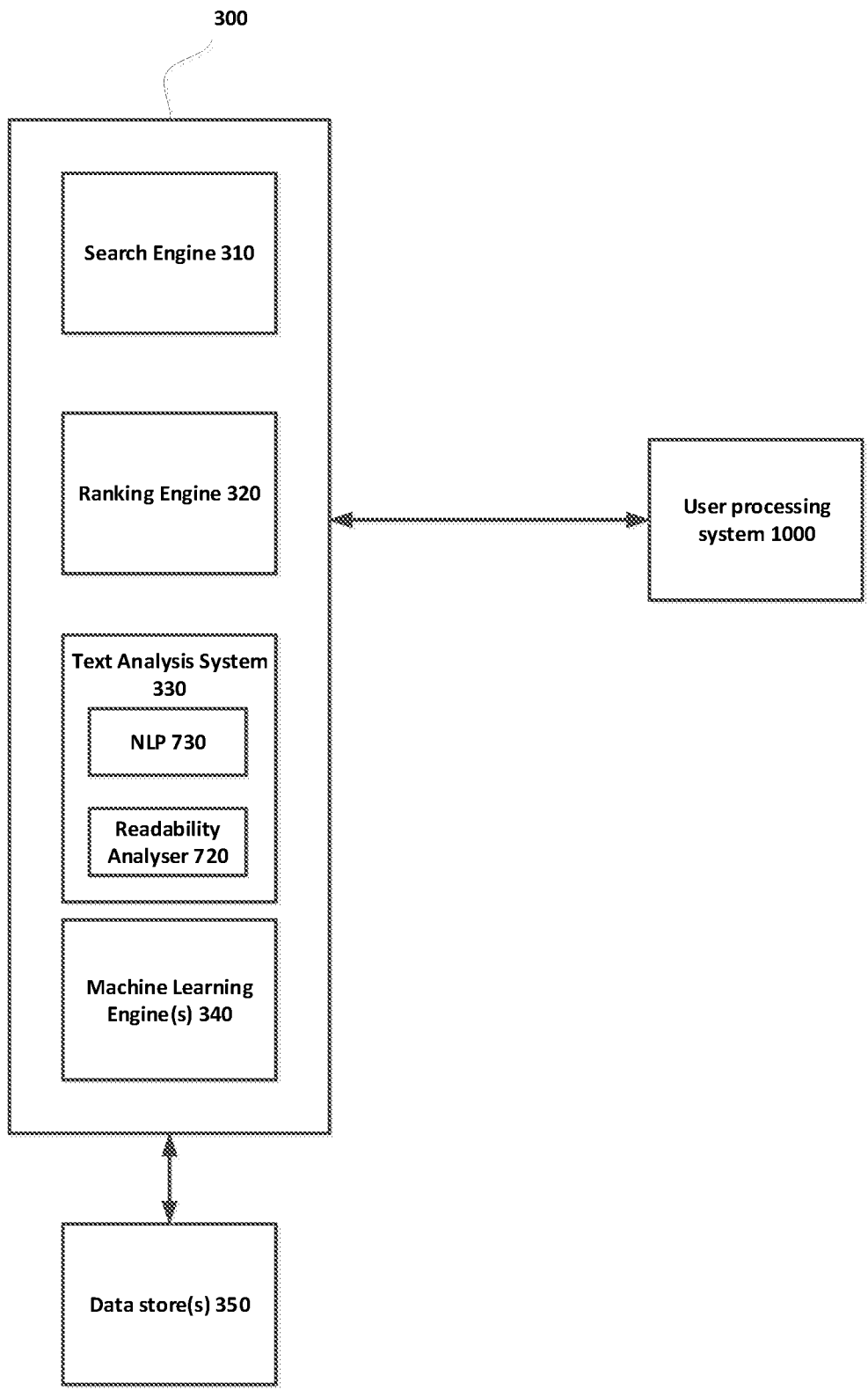
FIG. 3 is a flowchart representing an example method of determining lesson content for a teaching and learning plan.

Referring to FIG. 3 there is shown a system diagram of a computerised system 300 for implementing the above described method in relation to FIG. 11. The computerised system 300 can be implemented in the form of one or more processing systems, such as one or more server processing systems configured according to processing system 100 discussed above. The computerised system 300 is in data communication with a user processing system 1000 operated by a user. The user processing system 1000 may be a processing system 100 such as a general desktop computer, smart phone, tablet processing system, or the like.

The computerised system 300 includes or is able to access one or more data stores 350. The data stores are generally cloud data storage devices. It will be appreciated throughout the description that a plurality of data stores can be used. However, a single data store including logical divisions in data can be used. In one form, the data store may be a database including a number of tables and a number of records for various forms of data that are stored.

As shown in FIG. 3, the computerised system 300 includes a number of components. In particular, the computerised system 300 includes a search engine 310 and a ranking engine 320. Furthermore, the system 300 includes a text analysis system 330 including a natural language processor 730 and a readability analyser 720. The system also includes a machine learning engine 340.

A specific use case of the computer implemented method 1000 and system 300 described above relates to determining lesson content for generating teaching and learning plan. Context in relation to the use of the above-mentioned search engine for this application will be described. Currently school teachers have to manually prepare and create teaching and learning programs for their classes. Teaching and learning programs are the lesson plans, designs and materials, and the ordering of those elements, to meet the curricula for their classes and school. Some teachers are able to share teaching and learning programs within schools, or between schools within a geographical system of schools, or affiliation of schools. Whilst this reduces some of the work involved, the shared programs take no account of the specific requirements of a particular school, let alone class, with no consideration of the socio-economic, cultural and learning stage of a particular class. The programs also do not take account of the diverse, growing and ever-changing content and experiences available, such as via the Internet. Often, content is out-of-date, or removed from current news, trends, or discoveries each day. Nor do the repositories of curriculum content, or the current teaching and learning programs have the ability to automatically adapt with changes in curricula. In addition to the substantial, industry-wide issues described above, there is also the challenge of providing continuity of learning for classes, when teachers are away ill, on professional development, or when new teachers are required for a class during the scholastic year. Attempts at addressing this issue have not directly linked the teaching and learning program with content and experiences dynamically drawn from the Internet and a diversity of content creators, whilst meeting the prescribed curriculum requirements for that class and teacher. They also have not dynamically and continually curated the content and experiences for the individual teacher and class, so that they fit within the teaching program, at that precise point of the academic year. There is a problem in relation to how to bring the diversity of learning experiences to each classroom which meets their needs and preferences, without creating a homogenous curriculum across a sector and locality of schools. Significant amounts of time for teachers are lost due to this problem when preparing teaching and learning programs, and finding the content to fulfil the program. The computerised system described in relation to FIG. 3 attempts to address one or more of the above-mentioned disadvantages. It should be appreciated from the above examples that the earlier examples have broader applications and can be used in more traditional search engine contexts.

Figure 4:
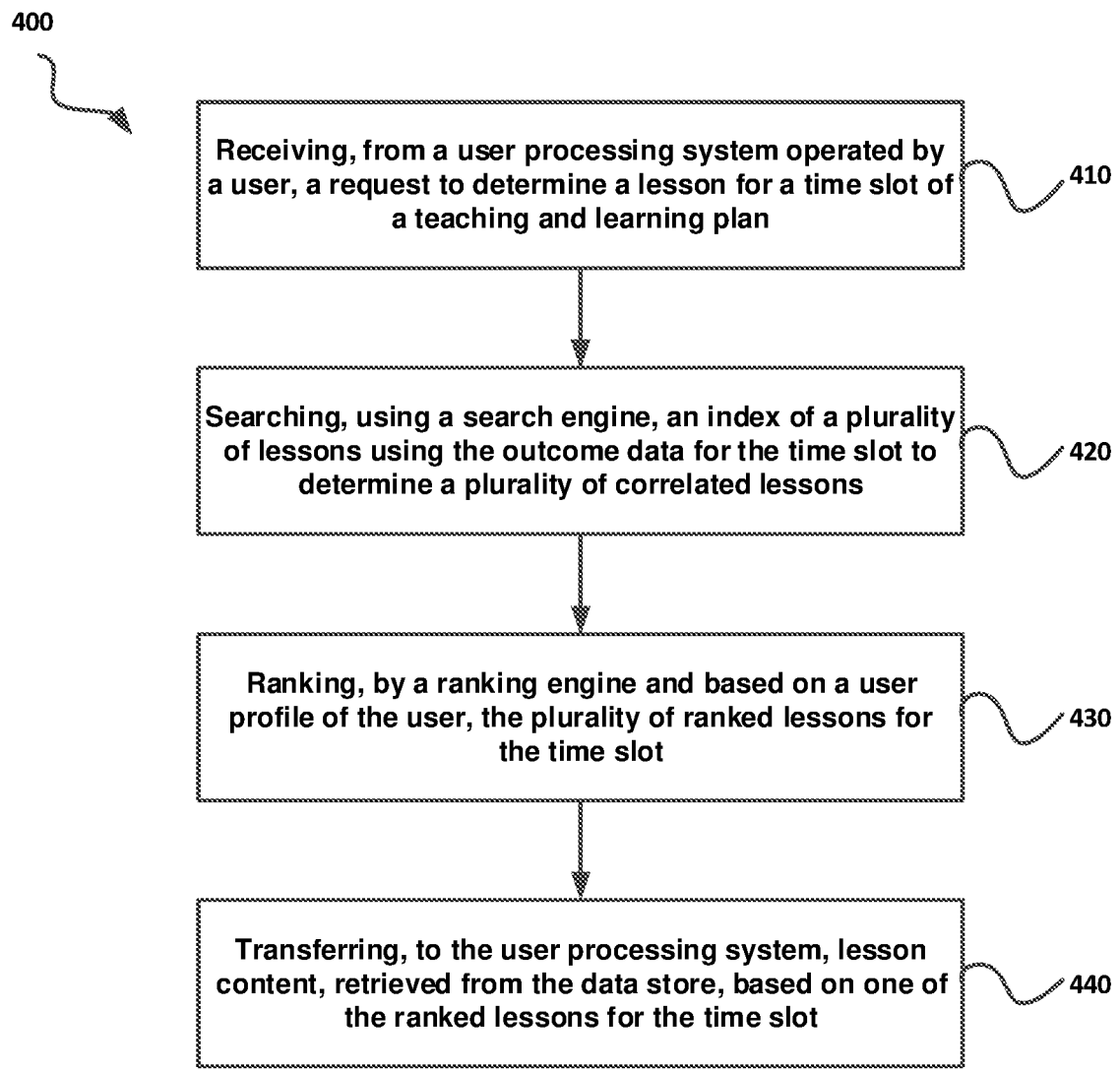
FIG. 4 is a block diagram representing an example computerised system for determining lesson content for a teaching and learning plan.

Referring to FIG. 4, there is shown a flowchart representing an example computer implemented method 400 performed by the computerised system 300, as shown by example in FIG. 4, for determining lesson content for a teaching and learning plan.

In particular, at step 410, the method 400 includes the computerised system 300 receiving, from a user processing system 1000 operated by a user, a request to determine a lesson for a time slot of a teaching and learning plan stored in a data store 350 accessible by the computerised system 300, wherein the time slot has associated therewith outcome data from a curriculum.

At step 420, the method 400 includes the computerised system 300 searching, using the search engine 310, an index 315 of a plurality of lessons using the outcome data for the time slot to determine a plurality of highly correlated lessons.

At step 430, the method 400 includes the computerised system 300 ranking, by the ranking engine 320 and based a user profile of the user, the plurality of ranked lessons for the time slot.

At step 440, the method 400 includes the computerised system 300 transferring, to the user processing system 1000, lesson content, retrieved from the data store 350, based on one of the ranked lessons for the time slot.

The searching performed by the search engine 310 includes determining a level of correlation between readability score data and natural language processing data of lesson content for each lesson stored in the data store 350 and readability score range data and natural language processing data for the outcome data of the time slot stored in the data store 350. For example, the search engine 310 may determine a level of correlation between natural language processing data in the form of natural language meta data indicative of concepts for the outcome data and the lesson content of each lesson.

In one form, the computerised system 300 is configured to transfer, to the user processing system 1000, a top ranked lesson determined by the ranking engine 320 for the time slot. This allows for the user to confirm or dismiss the determined lesson content for the associated curriculum outcome associated with the timeslot. In the event that the user wishes to confirm the determined lesson content, the computerised system 300 is configured to receive, from the user processing system 1000, a selection of the top ranked lesson for teaching. The lesson content associated with the top ranked lesson is retrieved from data store 350 and transferred to the user processing system 1000 for use in teaching the lesson content in the time slot.

In certain instances, the user may not agree that the top ranked lesson which is determined by the computerised system 300 is appropriate for the outcome. In this case, the computerised system 300 can receive, from the user processing system 1000, a request from the user to be presented with one or more alternate lessons for the time slot. The computerised system 300 has stored in the data store 350 data indicative of non-top ranked relevant lessons for the time slot. In response to receiving the request for alternate lessons to be taught for the respective time-slot, at least some of the non-top ranked relevant lessons for the time slot which are stored in the data store 350 are retrieved. The computerised system 300 is then configured to transfer, to the user processing system 1000, one or more alternate lessons for the time slot indicative of at least some of the non-top ranked relevant lessons for the time slot. The computerised system 300 generally receives, from the user processing system 1000, a selection of one of the one or more alternate lessons for the time slot. The computerised system 300 then retrieves, from the data store 350, lesson content for the selected alternate lesson for the time slot which is then transferred to the user processing system 1000 for the alternate lesson to be taught in the time slot. The computerised system 300 adjusts, using one or more machine learning engines 340, the user content profile based on the user dismissing the top ranked relevant lesson and selecting the alternate lesson. As such, for other instances where lesson content for a future time slot is to be determined, the user profile, adjusted by one or more machine learning engines 340, can be taken into account such that there may be a higher accuracy for future lesson content later determined by the computerised system 300 for the user.

Generally, the user may wish to teach particular lesson content related to a particular topic or the like. As such, the user can interact with a user interface 1010, provided in the form of a webpage having an input field, for submitting one or more search terms for determining the lesson for the time slot. The computerised system 300 receives, from the user processing system 1000 via a user interface 1010, the one or more search terms for determining the lesson for the time slot. The computerised system 300 then performs, using a text analysis system 330, natural language processing upon the one or more search terms to determine one or more concepts associated with the one or more search terms. The computerised system 300 then searches, using the search engine 310, the index using the one or more concepts associated with the one or more search terms in order to determine the plurality of highly correlated lessons for the time slot.

The data store 350 is populated with curriculum data for various types of curriculum. For example, a user who registers with the computerised system 300 can upload a curriculum for one or more classes which they are teaching. Alternatively, curriculums for various schools can be obtained and uploaded to the computerised system 300 in order to populate the data store 350 with curriculum data which the user can select from to associate the respective outcomes with various time slots for a period of time (e.g. such as a teaching year of four terms, each term being 10 weeks long). In particular, the computerised system 300 is configured to obtain new curriculum text data indicative of a new curriculum. As discussed, this may be obtained from public records or may be submitted by a user. The computerised system 300 facilitates natural language processing on the new curriculum text data to generate natural language processing data for each outcome of the new curriculum. The curriculum data is stored in the data store 350. The curriculum data stored in the data store 350 is indicative of a readability score range data indicative of a readability score for each outcome and the natural language processing data for each outcome of the curriculum. In particular, a process of the computerised system 300 can analyse the new curriculum outcome grade level data to store in the data store the readability score range for each outcome of the new curriculum. For example, the process takes the grade level of the curriculum outcome and determines a range by setting values+/−2 of the value (i.e. Grade 3 would become a readability score range of 1-5) to determine and store the readability score range in the data store.

Furthermore, the computerised system 300 is also configured to populate the data store 350 with lesson content data. The lesson content may be submitted by a user of the computerised system 300, such as a teacher. Alternatively, the lesson content may be uploaded by other users, such as personnel associated with the party operating the computerised system 300. In particular, the computerised system 300 obtains new lesson content text data indicative of lesson content for a new lesson. The computerised system 300 facilitates readability analysis of the new lesson content text data to generate a readability score for the new lesson. The computerised system 300 also facilitates natural language processing on the new lesson content text data to generate the natural language processing data for the new lesson. The computerised system 300 stores, in the data store 350, the lesson content data indicative of the lesson content, readability score data indicative of the readability score for the new lesson and the natural language processing data for the new lesson. The computerised system 300 is further configured to modify the index according to the lesson content data such that the search engine 310 can determine if the new content data is appropriate a particular time slot having a particular outcome for the user.

Figure 5:
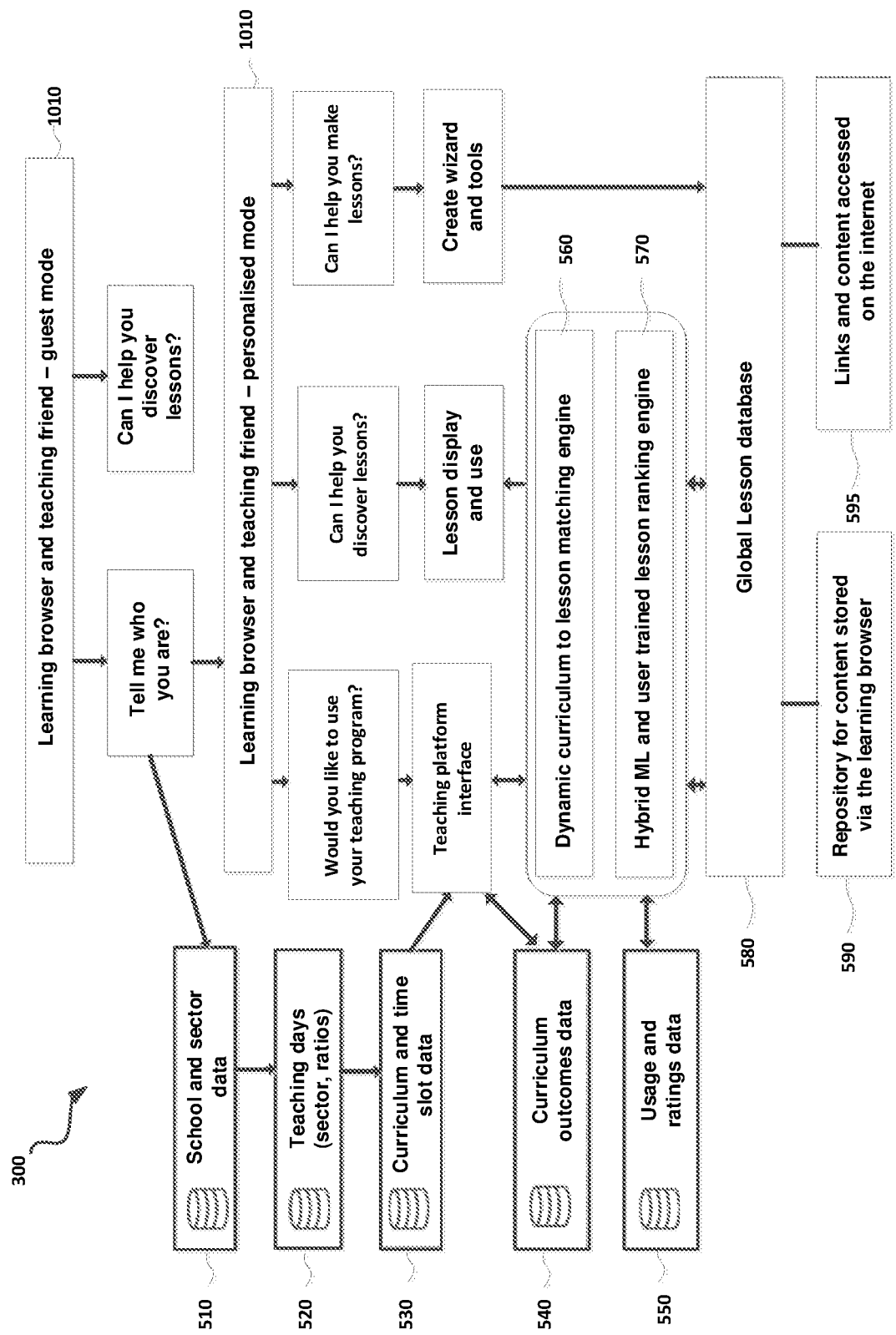
FIG. 5 is a block diagram of a further example of a computerised system for determining lesson content for a teaching and learning plan.

Referring to FIG. 5, there is shown a more specific example of a computerised system 300 for determining lesson content for the teacher's teaching and learning plan. The computerised system 300 is a web-based system, with access through a singular interface 1010 referred to as a learning browser, from which an automatically generated teaching and learning program for a teacher and class can be accessed. It will be appreciated that by "singular interface", one user interface design for all users regardless of whether they are a student, teacher, principal, administrator or content creator. However, the content dynamically presented within the interface 1010 and functions provided vary according to the user.

Input from the user is interpreted for each user using natural language understanding. A natural language processor is trained to learn the words and vernacular of the user in order to access, edit and use the teaching and learning program. Users interact with the user interface 1010 using text, speech and graphical user interface elements like buttons and menus.

When a teacher first creates an account with the computerised system 300, the teacher selects their school from a schools database 510, and selects which subjects and grades they are teaching. This process is repeated when a teacher is assigned a class in each new academic year. From the school and class profile data, the various machine learning systems determine the available lesson slots and times for a year. The various machine learning systems also determine the curriculum being taught, and allocates available times to each outcome for that curriculum. It then performs searches for each outcome and selects lessons with high correlations for each outcome. Once the correlated lessons are determined, those lessons are ranked for the particular user, using a hybrid scoring and weighting mechanism based on the teacher's prior usage, usage by teachers within a sector and locality, and/or usage across the entire curriculum, combined with teacher trained ranking system on the quality of lessons.

The computerised system 300 selects the most highly ranked lesson for each available time slot to complete the teaching and learning program across a particular time frame such as an academic year. The assignment of lessons to time slots is continually and dynamically updated throughout the academic year, adjusting according to the addition and removal of content, the rankings of lessons, and the aggregate usage patterns and formula. For example, if a recent event, such as a volcano were to erupt which is regularly in the news and on the Internet, lessons associated with time slots for science which may have previously been allocate a lesson related to gravity may dynamically change to a lesson related to volcanos.

Time slots are determined by a ratio of subject or topic teaching time, within the total available teaching and learning time. A subject need not be a traditional subject such as mathematics—it could be any sub-grouping of a curriculum.

The computerised method 400 and system 300 thereby provides a teacher a dynamic, ever-fresh teaching and learning program to meet their precise needs whilst concurrently fulfilling the syllabus requirements.

Continuing with FIG. 5, the system 300 includes a user interface 1010 referred to as a learning browser hosted on a cloud-computing platform which allows teachers to access the system 300 through the Internet via a browser application on their own personal computer, tablet or smart phone.

Any user can use the learning browser 1010 in un-authenticated mode (e.g. as a guest) to undertake content discovery of topics, units, lessons and individual files of content, but the system does not permit use and editing of that content unless the user has an account and are authenticated.

The computerised system 300 includes a control program, referred to as a bot or learning friend, which uses a natural language processor for performing natural language processing with text and voice understanding capabilities. It combines the capabilities for search and command in one function, intelligently detecting the difference between searches and commands provided via the user interface 1010 based upon natural language understanding of the users' text/voice based intent. This understanding combined with contextual information such as the user' current activity within the computerised system 300, previous usage patterns and related user trends helps the users perform meaningful actions. A teacher can then authenticate to the learning browser, and through this process ("Tell me who you are?") begins training their control program by selecting their school from a school database 510, and specifying the curriculum they are teaching.

The school database 510 includes information on which sector a school belongs, and from this can determine the available teaching days from the published school holiday and term dates. It also applies a pre-set subject weighting ratio for teaching time, derived from the number of outcomes to be covered by subject. This information provides the framework of available time slots for lessons for the computerised system 300. The computerised system 300 includes a curriculum and time slot matching engine 560 which matches curriculum outcomes to available time slots to achieve maximum curriculum coverage within the relevant academic year.

Once a teacher is authenticated, there are 3 main categories of functionality provided by the computerised system 300 via a web based user interface 1010: (i) to access and use the teaching platform ("would you like to use your teaching program?"); (ii) the discovery of learning content ("Can I help you discover lessons?"); and (iii) the creation of lessons and learning content ("Can I help you make lessons?)".

Usage data 550 on the discovery, display and use of lessons by teachers from the learning browser, feeds into a data lake stored in the data store 350 where it is processed by background machine learning tasks to establish usage and ratings data which is then stored in the relevant lesson record in a content database 710 for use by other processes. Background machine learning systems also aggregate the usage patterns by teachers in a similar school sector and locality (e.g. Catholic schools in New South Wales, Australia), and aggregates usage patterns within an entire curriculum. This information is used by a hybrid machine learning and user trained lesson ranking engine 560.

In addition, teachers can manually rate lessons, units and content, using a star rating system, when they access the relevant data and content. These ratings are processed by the ranking engine 320 and stored in a usage and ratings database 550, by individual user, by sector and locality, and in total aggregate. This information is also used by the hybrid machine learning and user trained lesson ranking engine 320.

The hybrid machine learning and user trained lesson ranking engine 320 generates a score from the information in the usage and ratings database 550 for a lesson for a particular user. A lesson does not have a single score that applies all users, as the score is calculated using a weighted formula based on the specific usage of the teacher and other teachers in their sector and locality.

As lessons are created, edited and organised by teachers or content creators via the learning browser, the lesson database 710 is progressively populated with the organising data, which may, but does not necessarily need to, reference descriptions, concept and language metadata, curriculum outcomes, and other identifying information. Background machine learning processes analyse and enhance the lessons with meta data from text analysis services and rating and ranking engines.

When the teaching platform user interface 1010 is accessed, the computerised system 300 is configured to generate a request to the dynamic curriculum to lesson matching engine 560, to select the lessons that are highly correlated to the curriculum outcomes as determined by their title and descriptions and by comparing additional concept and natural language understanding meta data that has been added by the system. Once the highly correlated lessons are determined for each time slot, then the hybrid machine learning and user trained lesson ranking engine 320 is applied to those lessons for that user, and the most highly ranked lesson is displayed via the teaching interface 1010.

The other corrected lessons can also be accessed, in ranking order from highest to lowest, and the teaching interface 1010 updated if a teacher manually selects alternatives. This selection then updates the usage and ratings database 550.

Figure 6:
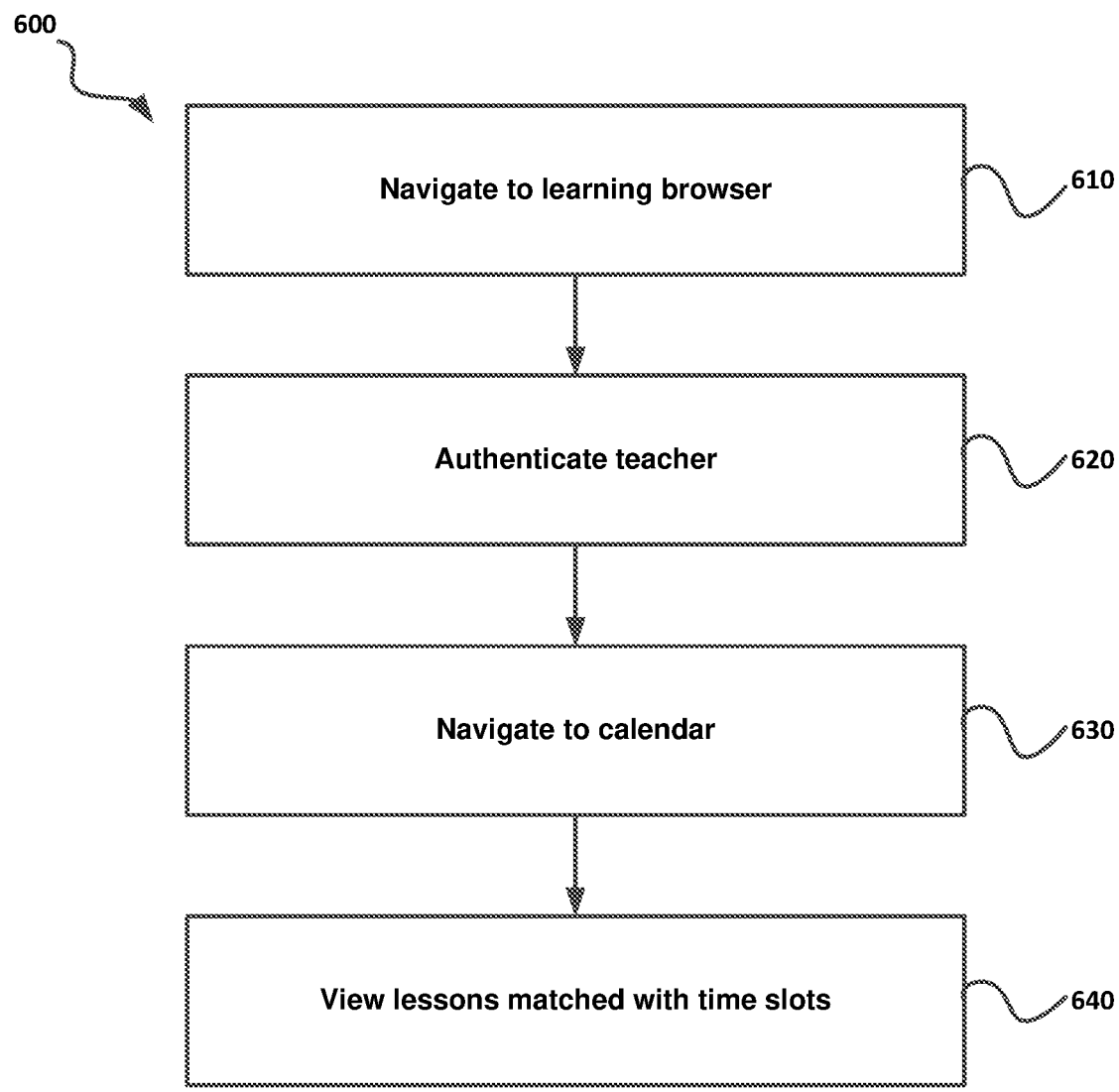
FIG. 6 is a flowchart representing a method of use of the computerised system of FIG. 5 by a user.

FIG. 6 shows a flowchart representing a method 600 of using the teaching platform provided through the interface of the computerised system 300.

At step 610, the teacher navigates to the learning browser. At step 620, the teacher is authenticated to the learning browser, so that the computerised system can reference the teacher's past lesson and content usage in the usage and ratings database, and previously used language commands. It also has data on the school, school sector and curriculum being used by the teacher.

At step 630, the teacher can navigate to a calendar or 'Class To Do' functions of a planner within the learning browser. The teacher can do this with a command via the user interface, or by traditionally browsing to the section.

At step 640, the teacher can view all the lessons displayed in the user interface, which had both a high correlation to curriculum as determined by the dynamic curriculum to lesson matching engine, and were the highest ranked lessons for the correlated lessons as determined by the hybrid machine learning and user trained lesson ranking engine.

The teacher can do a number of things within this step. They can manually bookmark lessons for use by the class. They can access and use the lessons displayed. They can select to turn on or off automated generation of their teaching program. They can view alternatives lessons which had a high curriculum correlation but were ranked second or lower by the hybrid machine learning and user trained lesson ranking engine.

The available teaching time by subject is defined in a teaching days and subject ratios database schema, by referencing: grade level (e.g. Grade 2), school level (e.g. primary school), sector (e.g. Catholic Schools), country (e.g. Australia) and teaching weeks. As an example, for an Australian government primary school, for grade 3, for the calendar and school year 2018, the available lesson slots per week, would be: as shown below in Table 1.

TABLE 1

Available lesson slots per week for an Australian government primary school, for grade 3, during the 2018 school year

| Subject Total Time | Slots | Time/Slot | Total time |
|---|---|---|---|
| Creative Arts (art, drama, music) | 5 | 30 mins | 2.5 hrs |
| English | 10 | 30 mins | 5 hrs |
| Geography | 3 | 30 mins | 1.5 hrs |
| History | 3 | 30 mins | 1.5 hrs |
| Languages | 2 | 30 mins | 1 hr |
| Mathematics | 9 | 30 mins | 4.5 hrs |
| Other | 3 | 30 mins | 1.5 hrs |
| Personal Development, Health and Physical Education | 5 | 30 mins | 2.5 hrs |
| Science and Technology | 5 | 30 mins | 2.5 hrs |
| Total | 45 | | 22.5 hrs |

This is divided into four terms with eight teaching weeks, commencing the first Monday in each term. So, for example, if the teaching days started on Tuesday 30 Jan. 2018, then the first available slots would be in the week commencing Monday 5 February (Term 1 Week 2): Term 1 Week 2, Term 1 Week 3, Term 1 Week 4, Term 1 Week 5, Term 1 Week 6, Term 1 Week 7, and Term 1 Week 8.

Based on the above example, there are therefore, 1440×30 minute lesson slots available in a school year (45×8×4) for all subjects. Continuing with this example, for the subject Geography, there are therefore 96 lesson slots (i.e. 3×8×4=96) available for the academic year.

The curriculum outcomes for each subject are then allocated within the available lesson slots. For example, if there are 10 content outcomes to be covered in Geography, then the outcomes are proportionately divided across the available slots as a whole number and not exceeding the number of available slots. Therefore, with 10 content outcomes, and 96 available slots, then each outcome is allocated 9 lesson slots (9×10=90, which is less than 96).

Curriculum content outcomes are stored within a curriculum outcomes database schema 540. Lessons and content are stored in the content database schema 710 and are tagged with the relevant curriculum outcomes from the curriculum outcomes database table 540.

Once the lessons with high correlation are determined, then these are ranked for the relevant user using a precalculated user content profile 820, with the highest ranked lesson(s) being displayed in available slots in the teaching platform interface.

An example lesson ranking formula is (higher numbers yield a higher ranking):

A. Base Score
  1.0: If the user has viewed in the last 2 years.
  0.5: If the user hasn't viewed but others teaching the curriculum have.
  0.1: If no one has viewed the lesson who is teaching the curriculum.
B. Score from Rating
  Must have 5+ ratings
  The average rating converted to the nearest whole number
  −1.0: If the lesson has a rating of 1 star
  −0.5: If the lesson has a rating of 2 stars
  0: If the lesson has a rating of 3 stars
  +0.5: If the lesson has a rating of 4 stars
  +1.0: If the lesson has a rating of 5 stars
C. Score from bookmarking, creating
  +0.5: When the user has bookmarked the lesson in the last 2 years
  +1.0: If the user rated the lesson with 5 stars
  +2.0: If the user has created the lesson
D. Ranking Impact from Total Views in Last 2 years
  In the event that 2 or more lessons have an equal score, then the one with the highest number of views in the last 2 years ranks higher.

In another form, the ranking of correlated lessons is heavily data-driven, customised specifically to the user profile through machine learning on user activity data. A machine learning model is trained on user activity data, optimising the function of predicting a lessons' relevance, respective to the user profile at a specific time. Given this model, all lessons can be ranked and ordered for the user based on evaluating the machine learning models' relevance prediction score. In one example, the machine learning model is trained on the usage data using matrix factorization to optimise a multi layer neural network model.

A lesson's relevance is defined as the likelihood that the lesson would be selected and enjoyed by the user profile, normally distributed over the set of all correlated lesson relevance scores that may fill a specific lesson slot. The machine learning model aims to replicate an accurate relevance score for the lesson had they been given unlimited time to manually compare and rank every lesson themselves.

Over time, a lessons' relevance may change due to a number of reasons including, but not limited to, their interests, their curriculum needs, there schools' needs, their classes' needs, and the relevance scores of other lessons.

Furthermore, the relevance score for the given user is highly affected by the predicted relevance score assigned to the lesson by other user profiles. This is due to the fact that similar users will find similar content relevant and vice versa. This effect occurs naturally during the machine learning model training which uncovers a dynamic number of well formed groups in the emerging user activity data patterns.

AH01(Document7)

Factors that affect a contents relevance score in the Machine Learning model would include, but are not limited to:

Context: Where you are in the application. e.g, within your lesson plan, in the learning browser, from a search, which filters are selected Curriculum: Which lessons meet your curriculum and curriculum outcomes Personal Feedback: Prior access, Prior bookmarking, your rating Content Popularity: Amount of inbound links in the web (external content) and amount of page views within the system (internal)

User Profile: "Who you are": User type, position, location, device, school

How you use the computerised system: Your preferences, common filter selections, popular searches, page access, Cohort Profile "Which groups you belong to": explicitly (groups, school, district) and implicitly through machine learning usage pattern matching and the ranking of the content by those groups.

Figure 7:
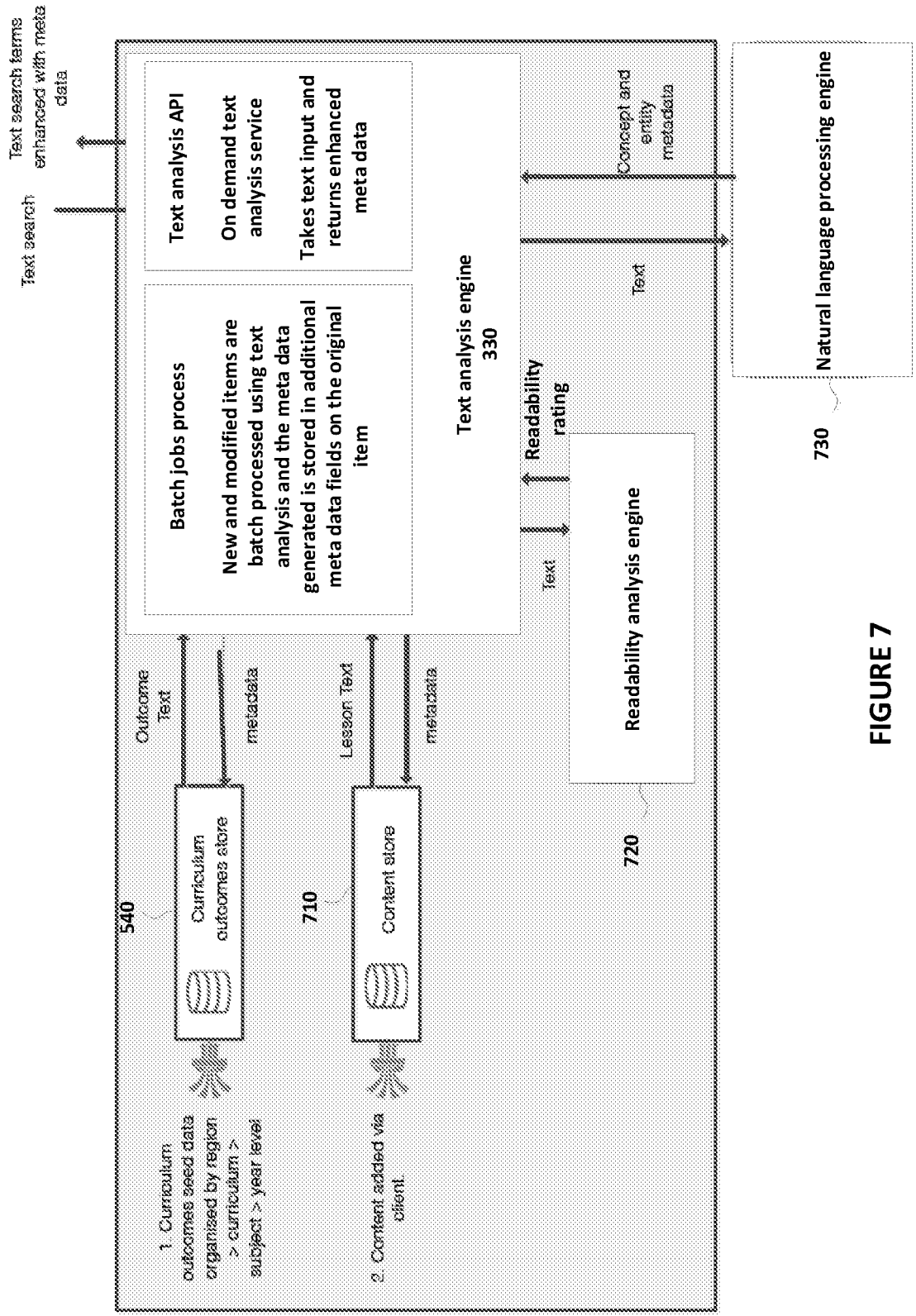
FIG. 7 is a block diagram representing an example of a text analysis system used by the computerised system of FIG. 5.

User activity data that is used to train the machine learning model includes, but not limited to page view tracking, lesson bookmarks and lesson ratings, searches, filter selections, bot interactions: queries and terms, and other key interactions in in the system: lesson PDF download, stimulus click and open etc Referring to FIG. 7 there is shown a block diagram of a text analysis system 330 that is used by the computerised system 300 of FIG. 5. In particular, the text analysis system 330 takes text as input and performs analysis of it and returns metadata that is used to enhance the systems effectiveness when executing searches. The text is enhanced with metadata on the readability level (the numeric representation of an individual's reading ability or a text's readability) as well as concepts, entities, keywords, categories, sentiment, emotion, relations and semantic roles.

The text analysis system 330 uses two sub-systems, namely a readability analyser 720 and a natural language processor 730, such as IBM Watson Natural Language Understanding, to perform specific parts of the text analysis, wherein results from the two sub-systems are combined. The resulting new metadata is then recorded on the item in the data store 350 allowing it to be used by other processes.

Curriculum outcome data can be imported from government websites and manually processed and seeded to the curriculum outcomes store 540, organised by name, description, region, curriculum, year level, and subject. These curriculum items bare the learning outcomes that teachers are trying to meet with their students.

Lesson content is added via the client web interface and is stored in the content store 710. Specific fields of text from the content items in the content store (name, overview, key inquiry question, curriculum items, vocabulary, details, supporting material, worksheets, stimulus resources) are set for analysis as a batch job and these fields are then automatically queued for analysis if they are modified.

Additionally when new content is added to the computerised system 300 by a user using the web interface, a batch job is added to analyse the set text fields when the user saves the content.

Any time an item in the curriculum outcome or content store is added or modified, the item is queued for text analysis by the batch job processing. The text analysis system 330 takes each of the items in the queue and performs text analysis on the items text content (name, overview, key inquiry question, curriculum items, vocabulary, details, supporting material, worksheets, stimulus resources).

The text analysis system takes an item for analysis and performs readability analysis on the text using an algorithm that gives a readability score based on word count, mean sentence length and mean log word frequency. This value is stored as the readability score for the text. The text is also processed using the natural language processor 730, such as IBM Watson Natural Language Understanding. The natural language processor 730 takes text input and analyses it to extract meta-data such as concepts, entities, keywords, categories, sentiment, emotion, relations and semantic roles using natural language understanding. The output of the two sub-processes are combined and the resulting metadata is recorded in additional fields on the item in the originating database store.

The metadata enhanced items in the curriculum outcome store 540 and the content store 710 are then indexed into the search engine 310, which can be provided in the form of the Elasticsearch™ search engine, so the meta data content fields may be used when determining search matches.

The text analysis system 330 is also available via an API (Application Programming Interface) such that the same text analysis outlined above is performed on demand. Search requests made by the user or the matching engine 560 are processed and enhanced with the additional meta data before being returned. The search text meta data can then be compared to the curriculum outcome and content item meta data to find matches based on concept, entity, etc.

Figure 8:
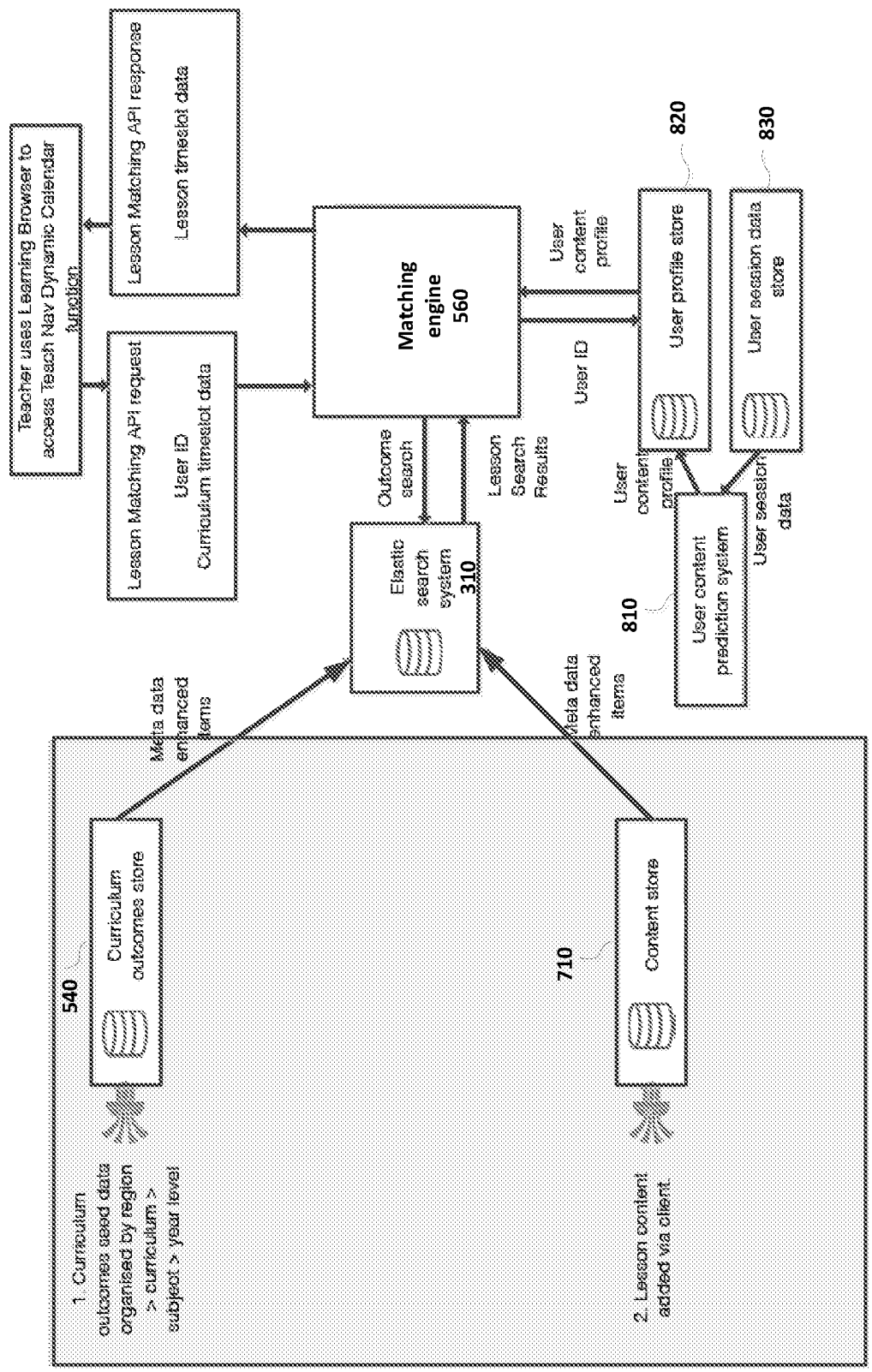
FIG. 8 is a block diagram representing an example dynamic curriculum to lesson matching engine used by the computerised system of FIG. 5.

Referring to FIG. 8 there is shown a system diagram of the dynamic curriculum to lesson matching engine 560. In particular, curriculum outcome text that is stored in the curriculum outcomes store 540 is processed by background machine learning tasks that add natural language understanding, readability analysis and concept metadata to each outcome record using the text analysis system 330. This metadata provides additional options for matching when searching for content with a user search request, which has also been processed to provide additional natural language understanding meta data, readability meta data and concept meta data. Lesson content which is added by content creators and teachers using the internet browser interface or external internet content that has been selected for inclusion or referencing by the computerised system 300, is also processed by machine learning background tasks to generate additional concept, readability analysis and natural language understanding metadata. This can be used to infer a concept match between curriculum outcome concepts and the lesson content concepts even if there is no exact text match to the search terms in the original content description.

The text analysis system 330 takes any text or URL as input and provides a text analysis as output that includes keywords, emotion, entities, entity types, concept and readability metadata.

When a teacher uses the teaching platform user interface 1010 to access a dynamic calendar function, a request is made to the matching engine, where the request is indicative of a user identity and curriculum time slot data. The curriculum time slot data details how much time, how often and which curriculum outcome should be taught for each lesson slot. It is pre-generated when the user registers and provides their school and curriculum information. The purpose of the matching engine is to populate the time slot data with lessons from the content store that match the goals of the curriculum learning outcomes for each slot. This matching is accomplished by requesting a search using the search engine on each curriculum outcome and processing the results with the user content profile data and lesson ranking and rating data to determine the best lessons to fulfil an outcome. This is repeated for each outcome until the required time slots are filled. In addition, an array of the next best ranked lessons is returned to allow the user to modify the generated options if they wish. This lesson time slot data is returned from the matching engine to the learning browser for display and the data is also stored in the users profile for retrieval on subsequent sessions.

A user content prediction system 810 processes user session data (i.e. content accessed, time spent, ratings given) to create the user content profile 820, as discussed in further detail below.

Figure 9:
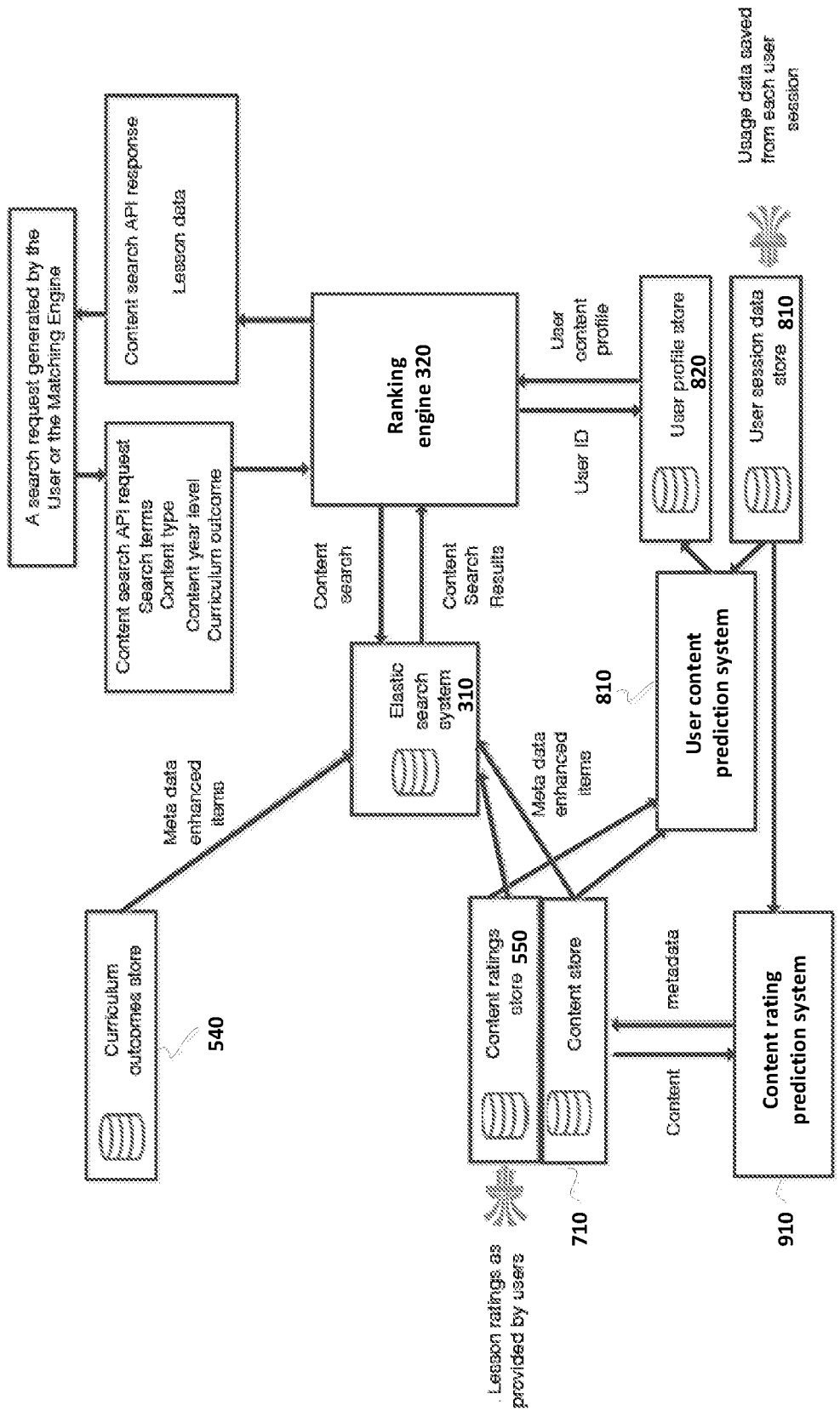
FIG. 9 is a block diagram representing an example lesson ranking engine used by the computerised system of FIG. 5.

Referring to FIG. 9 there is shown an example of the system diagram of the lesson ranking engine 320 of the computerised system 300 of FIG. 5.

In particular, users are able to rate lessons they have used via the client application graphical user interface 1010 using a web browser, for example a JavaScript application. The content ratings data is stored in the content rating store and associated with the content record from the content store 710.

Background machine learning systems process content and user session data to provide a formula derived rating prediction which is then stored in the content ratings store (the machine learning rating).

Lesson usage data such as search terms, commands used, lessons accessed, time accessed, typical session times and location is saved to the data lake of the data store and processed and stored in the user session data store 830. This data is used by a user content prediction system 810 and a machine learning content rating system to derive a relevance score for each piece of content for each user.

The user content prediction system 810 uses data from the content store 710, the content ratings store and the user session logs 830 to try and predict what type of content is of the most interest to the user. The type of content of most interest to the user is stored in the user's content profile 820 which is then used by the ranking engine 320 to personalise results when performing content searches for that user.

A search request is processed by the ranking engine 320 and then a content search is executed by the search engine 310 which returns content with enhanced meta data to the ranking engine 320 for processing. Additionally the user content profile is retrieved from the user profile store 820, which contains a pre-calculated content prediction profile for the user.

The ranking engine 320 processes search results which contain the global user and machine predicted ratings with data from the user's content profile and establishes the most relevant content which matches the search terms for that user.

In one form, the search engine 310 is a managed search service provided by a third party, such as Amazon Web Services. Meta data enhanced content from the curriculum outcomes store 540, content store 710 and the content ratings store is indexed into the search engine system so it can be utilised in searches by the ranking engine.

As shown in the system diagrams, the computerised system 300 includes two systems which make machine learned predictions, namely the content rating prediction system 910 and the user content prediction system 810. The content rating prediction system 910 predicts the rating of content for a specific user. The rating is a floating point value between 0-1 which is displayed in the client application as a 5 star rating system. The user content prediction system 810 predicts which content is most relevant (likely to be used next) by the user.

In one form, a third party API can be used to perform the predictions. In one example, Amazon Machine Learning API can be used to generate the predictions. Amazon Machine Learning (AML) is a managed service for building machine learning models and generating predictions available from Amazon Web Services (AWS). The computerised system manages and stores the data features, models and jobs and prepares requests and deals with responses from AML.

Each time a user interacts with the browser application their action is stored in the usage log. Signing in via the server application, accessing content, book marking content, searching for content are examples of the types of action that the user may perform which are logged for use by the data processing. In the case of the user content prediction system 810, raw data (input variables) from the usage and application logs is refined down to key features which are selected by data analysts to be relevant to the prediction system. In the user content system the data that is turned into features would be user sign in/out time, user session duration, user actions within the application, time user spends in each content item, which content items each user bookmarks, search terms and filters used.

The purpose of the user content prediction system 810 is to predict which content will appeal to a specific user based on previous content accessed, common traits between the user and other users, search terms used, content ratings, enhanced meta data like concept, readability level, entities and curriculum outcomes.

Each time a user interacts with the browser application their actions are stored in the usage log in the data store. Signing in via the client application, accessing content, book marking content, searching for content are examples of the types of action that the user performs which are logged for use by the data processing.

In the case of the user content prediction system 810, raw data (input variables) from the usage and application logs is refined down to key features which are selected by data analysts to be relevant to the prediction system. The enhanced meta data is also used as input to allow the machine learning system to find common features of content that has high user ratings.

In the content rating prediction system 910 the data that is turned into features would be number of times content item has been accessed, repeat visits to the same content item by a user, time user spends in each content item and enhanced meta data like concepts, keywords and readability level. The purpose of the content rating prediction system 910 is to predict a machine learned rating for each item of content.

Text extracts or descriptions from a specific item of content or entered by the user can be sent to the text analysis system to be analysed and enhanced with additional meta data. Provided below is an example of a text description of a group of six lessons (a unit) and the additional meta data that is generated by the text analysis system.

Example input text:

"Six lessons focusing on the study of the natural characteristics of Australia and other places in the world. This includes a natural environment study of China, Madagascar and Brazil and an overview lesson about the basic geography of the world. Activities work on developing the geographical concepts of place, space, environments and scale and sustainability. Use of the geographical tools of using maps, graphs and statistics and visual representations is incorporated throughout. Spatial technologies are addressed in the fifth and sixth lessons. Google Tour Builder is used in Lesson 6 which requires a gmail account to access."

Example output from the text analysis system 330 is provided below:

```
{
    "readabilityity": [
        {
            "type": "readability measure",
            "value": 1100
        },
        {
            "type": "mean sentence length",
            "value": 16.17
        },
        {
            "type": "mean log word frequency",
            "relevance": 3.14
        },
        {
            "type": "word count",
            "value": 97
        },
    ]
}
{
  "keywords": [
    {
      "text": "natural environment study",
      "relevance": 0.921843
    },
    {
      "text": "Google Tour Builder",
      "relevance": 0.909121
    },
    {
      "text": "geographical concepts",
      "relevance": 0.771273
    },
    {
      "text": "geographical tools",
      "relevance": 0.752276
    },
    {
      "text": "overview lesson",
      "relevance": 0.741796
    },
    {
      "text": "gmail account",
      "relevance": 0.694975
    },
    {
      "text": "basic geography",
      "relevance": 0.691224
    },
    {
      "text": "natural characteristics",
      "relevance": 0.686085
    },
    {
      "text": "visual representations",
      "relevance": 0.678206
    },
    {
      "text": "Spatial technologies",
      "relevance": 0.670846
    },
    {
      "text": "Madagascar",
      "relevance": 0.343647
    },
    {
      "text": "world",
      "relevance": 0.339152
    },
    {
      "text": "lessons",
      "relevance": 0.335803
    },
    {
      "text": "sustainability",
      "relevance": 0.314458
    },
    {
      "text": "graphs",
      "relevance": 0.305518
    },
    {
      "text": "Brazil",
      "relevance": 0.299349
    },
    {
      "text": "Australia",
      "relevance": 0.279955
    },
    {
      "text": "places",
      "relevance": 0.27972
    },
    {
      "text": "China",
      "relevance": 0.273592
    },
    {
      "text": "Activities",
      "relevance": 0.27112
    },
    {
      "text": "place",
      "relevance": 0.270543
    },
    {
      "text": "space",
      "relevance": 0.270399
    },
    {
      "text": "environments",
      "relevance": 0.270255
    },
    {
      "text": "scale",
      "relevance": 0.270111
    },
    {
      "text": "maps",
      "relevance": 0.268123
    }
  ]
}
```

```
{
  "entities": [
    {
      "type": "Company",
      "text": "gmail",
      "relevance": 0.756704,
      "count": 1
    },
    {
      "type": "Location",
      "text": "Madagascar",
      "relevance": 0.730574,
      "disambiguation": {
        "subtype": [
          "Country"
        ]
      },
      "count": 1
    },
    {
      "type": "Company",
      "text": "Google",
      "relevance": 0.721518,
      "disambiguation": {
        "subtype": [
          "AcademicInstitution",
          "AwardPresentingOrganization",
          "OperatingSystemDeveloper",
          "ProgrammingLanguageDeveloper",
          "SoftwareDeveloper",
          "VentureFundedCompany"
        ],
        "name": "Google",
        "dbpedia_resource": "http://dbpedia.org/resource/Google"
      },
      "count": 1
    },
    {
      "type": "Location",
      "text": "Brazil",
      "relevance": 0.675115,
      "disambiguation": {
        "subtype": [
          "Country"
        ]
      },
      "count": 1
    },
    {
      "type": "Location",
      "text": "Australia",
      "relevance": 0.662317,
      "disambiguation": {
        "subtype": [
          "Country"
        ]
      },
      "count": 1
    },
    {
      "type": "Location",
      "text": "China",
      "relevance": 0.651582,
      "disambiguation": {
        "subtype": [
          "Country"
        ]
      },
      "count": 1
    }
  ]
},
{
  "concepts": [
    {
      "text": "Geography",
      "relevance": 0.970904,
      "dbpedia_resource": "http://dbpedia.org/resource/Geography"
    },
    {
      "text": "Natural environment",
      "relevance": 0.826399,
      "dbpedia_resource": "http://dbpedia.org/resource/Natural_environment"
    },
    {
      "text": "Earth",
      "relevance": 0.601653,
      "dbpedia_resource": "http://dbpedia.org/resource/Earth"
    },
    {
      "text": "Ecology",
      "relevance": 0.592179,
      "dbpedia_resource": "http://dbpedia.org/resource/Ecology"
    },
    {
      "text": "Universe",
      "relevance": 0.579563,
      "dbpedia_resource": "http://dbpedia.org/resource/Universe"
    },
    {
      "text": "Map",
      "relevance": 0.532546,
      "dbpedia_resource": "http://dbpedia.org/resource/Map"
    },
    {
      "text": "Space",
      "relevance": 0.49902,
      "dbpedia_resource": "http://dbpedia.org/resource/Space"
    },
    {
      "text": "Cartography",
      "relevance": 0.476206,
      "dbpedia_resource": "http://dbpedia.org/resource/Cartography"
    }
  ]
}
```

In the example response data from the text analysis system one of the concepts returned is "Natural Environment". This is a broad term covering species, climate, weather and natural resources. Using this additional metadata it is possible to find lesson content that is conceptually related even though it may not have any key words that match the search query terms.

For example both the word "Climate" and the word "Atmosphere" would generate concept metadata that included the concept "Natural Environment". When a user searched for content on "Climate" they would also see content on "Atmosphere" because the system also searches for content that is related by concept, not just key words. Content could also be selected or filtered based on its readability measure (reading level).

The readability analysis system can be configured to use the Coleman-Liau index (Coleman, Meri; and Liau, T. L. (1975); A computer readability formula designed for machine scoring, Journal of Applied Psychology, Vol. 60, pp. 283-284) to set a score for a text. This is calculated according to Equation 1:

$$\text{ReadabilityScore} = 0.0588L - 0.296S - 15.8 \qquad \text{Equation (1)}$$

where:

L is the average number of letters per 100 words; and

S is the average number of sentences per 100 words.

Equation 1 provides a result which is the approximate grade level required to understand the text on first reading.

Many modifications within the scope of the invention will be appreciated by those skilled in the art without department from the spirit of the invention.

The invention claimed is:

1. A computer implemented method performed by a computerised system, wherein the computer implemented method comprises steps of:
   generating an index of electronic objects, comprising steps of:
      performing, upon each electronic object, natural language processing, using a natural language processor, and readability analysis, using a readability analyser, to generate natural language processing data and a readability score for the respective object; and
      storing in the index, for each electronic object, electronic object data indicative of the electronic object and associated meta-data indicative of the natural language processing data and the readability score;
   receiving, from a user operating a user processing system, a request to perform a search of the index, wherein the request has associated therewith input data;
   performing, upon the input data, natural language processing, using the natural language processor to generate natural language processing data and a readability range for the input data;
   searching, using a search engine, the index based upon the readability range and the natural language processing data for the input data, to determine a plurality of correlated electronic objects;
   generating, using a ranking engine, a ranked list of the plurality of correlated electronic objects based on a correlation level for each of the plurality of electronic objects and a machine learned rating generated by a machine learned rating prediction system trained according to a profile associated with the user, the profile being indicative of natural language processing data generated, by the natural language processor, based on previous search requests received from the user and performed by the search engine; and
   transferring, to the user processing system, search results indicative of at least a portion of the ranked list of the plurality of correlated electronic objects.

2. The computer implemented method according to claim 1, wherein the plurality of electronic objects are electronic lesson objects stored in a data store accessible by the computerised system, wherein each electronic lesson object is indicative of lesson content for a lesson, wherein the input data is outcome data determined by the natural language processor in respect of processing curriculum text, wherein the searching performed by the search engine is to determine one or more correlated electronic lesson objects to assign to a time slot of a lesson plan.

3. The computer implemented method according to claim 2, wherein the method includes:
   transferring, to the user processing system, the search results indicative of only a top ranked lesson determined by the ranking engine for the time slot; and
   receiving, from the user processing system, a selection of the top ranked lesson for teaching, wherein the electronic lesson object retrieved from data store relates to the top ranked lesson.

4. The computer implemented method according to claim 2, wherein the method includes:
   storing, in the data store, data indicative of non-top ranked relevant lessons for the time slot;
   transferring, to the user processing system, only a top ranked lesson determined by the ranking engine for the time slot;
   receiving, from the user processing system, a request from the user to be presented with one or more alternate lessons for the time slot;
   retrieving, from the data store, at least some of the non-top ranked relevant lessons for the time slot;
   transferring, to the user processing system, one or more alternate lessons for the time slot indicative of at least some of the non-top ranked relevant lessons for the time slot;
   receiving, from the user processing system, a selection of one of the one or more alternate lessons for the time slot;
   retrieving, from the data store, lesson content for the selected alternate lesson for the time slot;
   transferring, to the user processing system, the lesson content for the alternate lesson for the time slot; and
   adjusting, by a machine learned content prediction system, the profile associated with the user based on the user dismissing the top ranked lesson and selecting the alternate lesson.

5. The computer implemented method according to claim 2, wherein the method includes populating the data store with curriculum data, wherein the method includes:
   obtaining new curriculum text data indicative of a new curriculum;
   performing natural language processing on the new curriculum text data to generate natural language processing data for each outcome of the new curriculum;
   performing readability analysis on the new curriculum text data to generate a readability range for each outcome of the new curriculum;
   storing, in the data store, curriculum data indicative of the new curriculum including readability score data indicative of the readability range for each outcome and the natural language processing data for each outcome of the curriculum; and
   modifying the index according to the curriculum data.

6. The computer implemented method according to claim 2, wherein the method includes populating the data store with a new electronic lesson object, wherein the method includes:
   obtaining new lesson content text data indicative of lesson content for a new lesson;
   performing readability analysis upon the new lesson content text data to generate a readability score for the new lesson;
   performing natural language processing on the new lesson content text data to generate the natural language processing data for the new lesson;
   storing, in the data store, the new electronic lesson object indicative of the lesson content for the new lesson, readability score data indicative of the readability score for the new lesson and the natural language processing data for the new lesson; and
   modifying the index according to the new lesson stored in the data store.

7. The computer implemented method according to claim 1, wherein the readability score indexed within the index for each electronic object is based upon a word count, a mean sentence length and a mean log word frequency of the respective electronic object.

8. A computerised system configured to perform steps of:
   generating an index of electronic objects, comprising steps of:
      performing, upon each electronic object, natural language processing, using a natural language processor, and readability analysis, using a readability analyser, to generate natural language processing data and a readability score for the respective object; and storing in the index, for each electronic object, electronic object data indicative of the electronic object and associated meta-data indicative of the natural language processing data and the readability score;

receiving, from a user operating a user processing system, a request to perform a search of the index, wherein the request has associated therewith input data;

performing, upon the input data, natural language processing, using the natural language processor to generate natural language processing data and a readability range for the input data;

searching, using a search engine, the index based upon the readability range and the natural language processing data for the input data, to determine a plurality of correlated electronic objects;

generating, using a ranking engine, a ranked list of the plurality of correlated electronic objects based on a correlation level for each of the plurality of electronic objects and a machine learned rating generated by a machine learned rating prediction system trained according to a profile associated with the user, the profile being indicative of natural language processing data generated, by the natural language processor, based on previous search requests received from the user and performed by the search engine; and transferring, to the user processing system, search results indicative of at least a portion of the ranked list of the plurality of correlated electronic objects.

9. The computerised system according to claim 8, wherein the plurality of electronic objects are electronic lesson objects stored in a data store accessible by the computerised system, wherein each electronic lesson object is indicative of lesson content for a lesson, wherein the input data is outcome data determined by the natural language processor in respect of processing curriculum text, wherein the searching performed by the search engine is to determine one or more correlated electronic lesson objects to assign to a time slot of a lesson plan.

10. The computerised system according to claim 9, wherein the computerised system is configured to perform steps comprising:
transferring, to the user processing system, the search results indicative of only a top ranked lesson determined by the ranking engine for the time slot; and
receiving, from the user processing system, a selection of the top ranked lesson for teaching, wherein the electronic lesson object retrieved from data store relates to the top ranked lesson.

11. The computerised system according to claim 9, wherein the computerised system is configured to perform steps comprising:
storing, in the data store, data indicative of non-top ranked relevant lessons for the time slot;
transferring, to the user processing system, only a top ranked lesson determined by the ranking engine for the time slot;
receiving, from the user processing system, a request from the user to be presented with one or more alternate lessons for the time slot;
retrieving, from the data store, at least some of the non-top ranked relevant lessons for the time slot;
transferring, to the user processing system, one or more alternate lessons for the time slot indicative of at least some of the non-top ranked relevant lessons for the time slot;
receiving, from the user processing system, a selection of one of the one or more alternate lessons for the time slot;
retrieving, from the data store, lesson content for the selected alternate lesson for the time slot;
transferring, to the user processing system, the lesson content for the alternate lesson for the time slot; and
adjusting, by a machine learned content prediction system, the profile associated with the user based on the user dismissing the top ranked lesson and selecting the alternate lesson.

12. The computerised system according to claim 9, wherein computerised system is configured to populate the data store with curriculum data comprising steps of:
obtaining new curriculum text data indicative of a new curriculum;
performing natural language processing on the new curriculum text data to generate natural language processing data for each outcome of the new curriculum;
performing readability analysis on the new curriculum text data to generate a readability range for each outcome of the new curriculum;
storing, in the data store, curriculum data indicative of the new curriculum including readability score data indicative of the readability range for each outcome and the natural language processing data for each outcome of the curriculum; and
modifying the index according to the curriculum data.

13. The computerised system according to claim 9, wherein the computerised system is configured to populate the data store with a new electronic lesson object comprising steps of:
obtaining new curriculum text data indicative of a new curriculum;
performing natural language processing on the new curriculum text data to generate natural language processing data for each outcome of the new curriculum;
performing readability analysis on the new curriculum text data to generate a readability range for each outcome of the new curriculum;
storing, in the data store, curriculum data indicative of the new curriculum including readability score data indicative of the readability range for each outcome and the natural language processing data for each outcome of the curriculum; and
modifying the index according to the curriculum data.

14. The computerised system according to claim 8, wherein computerised system is configured to determine the readability score for each electronic object based upon a word count, a mean sentence length and a mean log word frequency of the respective electronic object.

15. A non-transitory computer readable medium having recorded one or more programs that cause a computerised system to execute steps of:
generating an index of electronic objects, comprising steps of:
performing, upon each electronic object, natural language processing, using a natural language processor, and readability analysis, using a readability analyser, to generate natural language processing data and a readability score for the respective object; and storing in the index, for each electronic object, electronic object data indicative of the electronic object and associated meta-data indicative of the natural language processing data and the readability score;

receiving, from a user operating a user processing system, a request to perform a search of the index, wherein the request has associated therewith input data;

performing, upon the input data, natural language processing, using the natural language processor to generate natural language processing data and a readability range for the input data;

searching, using a search engine, the index based upon the readability range and the natural language processing data for the input data, to determine a plurality of correlated electronic objects;

generating, using a ranking engine, a ranked list of the plurality of correlated electronic objects based on a correlation level for each of the plurality of electronic objects and a machine learned rating generated by a machine learned rating prediction system trained according to a profile associated with the user, the profile being indicative of natural language processing data generated, by the natural language processor, based on previous search requests received from the user and performed by the search engine; and transferring, to the user processing system, search results indicative of at least a portion of the ranked list of the plurality of correlated electronic objects.

16. The non-transitory computer readable medium according to claim 15, wherein the plurality of electronic objects are electronic lesson objects stored in a data store accessible by the computerised system, wherein each electronic lesson object is indicative of lesson content for a lesson, wherein the input data is outcome data determined by the natural language processor in respect of processing curriculum text, wherein the searching performed by the search engine is to determine one or more correlated electronic lesson objects to assign to a time slot of a lesson plan.

17. The non-transitory computer readable medium according to claim 16, wherein the one or more programs cause the computerised system to execute steps of:
transferring, to the user processing system, the search results indicative of only a top ranked lesson determined by the ranking engine for the time slot; and
receiving, from the user processing system, a selection of the top ranked lesson for teaching, wherein the electronic lesson object retrieved from data store relates to the top ranked lesson.

18. The non-transitory computer readable medium according to claim 16, wherein the one or more programs cause the computerised system to execute steps of:
storing, in the data store, data indicative of non-top ranked relevant lessons for the time slot;
transferring, to the user processing system, only a top ranked lesson determined by the ranking engine for the time slot;
receiving, from the user processing system, a request from the user to be presented with one or more alternate lessons for the time slot;
retrieving, from the data store, at least some of the non-top ranked relevant lessons for the time slot;
transferring, to the user processing system, one or more alternate lessons for the time slot indicative of at least some of the non-top ranked relevant lessons for the time slot;
receiving, from the user processing system, a selection of one of the one or more alternate lessons for the time slot;
retrieving, from the data store, lesson content for the selected alternate lesson for the time slot;
transferring, to the user processing system, the lesson content for the alternate lesson for the time slot; and
adjusting, by a machine learned content prediction system, the profile associated with the user based on the user dismissing the top ranked lesson and selecting the alternate lesson.

19. The non-transitory computer readable medium according to claim 16, wherein the one or more programs cause the computerised system to populate the data store with curriculum data including steps of:
obtaining new curriculum text data indicative of a new curriculum;
performing natural language processing on the new curriculum text data to generate natural language processing data for each outcome of the new curriculum;
performing readability analysis on the new curriculum text data to generate a readability range for each outcome of the new curriculum;
storing, in the data store, curriculum data indicative of the new curriculum including readability score data indicative of the readability range for each outcome and the natural language processing data for each outcome of the curriculum; and
modifying the index according to the curriculum data.

20. The non-transitory computer readable recording medium according to claim 16, wherein the one or more programs cause the computerised system to execute steps of populating the data store with a new electronic lesson object comprising steps of:
obtaining new curriculum text data indicative of a new curriculum;
performing natural language processing on the new curriculum text data to generate natural language processing data for each outcome of the new curriculum;
performing readability analysis on the new curriculum text data to generate a readability range for each outcome of the new curriculum;
storing, in the data store, curriculum data indicative of the new curriculum including readability score data indicative of the readability range for each outcome and the natural language processing data for each outcome of the curriculum; and
modifying the index according to the curriculum data.

21. The non-transitory computer readable medium according to claim 15, wherein the one or more programs cause the computerised system to determine the readability score for each electronic object based upon a word count, a mean sentence length and a mean log word frequency of the respective electronic object.

* * * * *